United States Patent [19]

Gutierrez-Rubio

[11] Patent Number: 4,679,499
[45] Date of Patent: Jul. 14, 1987

[54] APPARATUS FOR SIZING AND PEELING LONGATED CYLINDRICAL BODIES OF VEGETABLE MATTER

[75] Inventor: Joaquin Gutierrez-Rubio, Seville, Spain

[73] Assignee: Sociedad Anonima de Racionalizacion y Mecanizacion (Sadrym), Seville, Spain

[21] Appl. No.: 753,901

[22] Filed: Jul. 11, 1985

[30] Foreign Application Priority Data

Sep. 21, 1984 [ES] Spain ................................. 536.171

[51] Int. Cl.$^4$ ............................................. A23N 7/04
[52] U.S. Cl. ...................................... 99/591; 99/588; 426/482
[58] Field of Search .................... 426/482, 483, 481; 99/591, 588

[56] References Cited

U.S. PATENT DOCUMENTS

| | | | |
|---|---|---|---|
| 1,325,847 | 12/1919 | Horst | 426/482 |
| 4,212,237 | 7/1980 | Hsu | 99/591 |
| 4,478,863 | 10/1984 | Van der Schoot | 426/482 |

FOREIGN PATENT DOCUMENTS

224870 12/1976 Spain .
237554 7/1978 Spain .

Primary Examiner—George Yeung
Attorney, Agent, or Firm—Cushman, Darby & Cushman

[57] ABSTRACT

Generally cylindrical bodies of vegetable matter such as spears of asparagus of varying diameter are telescopically inserted tip end-first into the horizontally radially outwardly opening mouthpieces in a drum that is mounted to rotate on a horizontal axis. A take-in conveyor system running towards the mouthpieces in the loading station, and served by guides which converge toward the individual mouthpieces assist in socketing the bodies in the mouthpieces. Flexible collars in the mouthpieces constrict to grip the end portions of the bodies, and the drum indexes to dispose those bodies so that they project vertically upwards, at the same time bringing a next row of mouthpieces to the loading station. At the cutting station disposed over the drum, pairs of diametrically opposed knives repeatedly descend, engage the bodies and remove strips of peel, the bodies being periodically relatively rotated so that one complete layer of peel is removed from each body before the drum indexes further to a horizontal unloading station. At the latter, the peeled bodies are extracted, arranged, cut cross-wise into sections of uniform length and variable-length remainders and shunted into different collection paths based on microprocessor-stored sensations of relative diameter gained from each of the bodies by sensing how far from a datum the knives in each pair had to close towards one another at the peeling station in order to remove peel from each body.

9 Claims, 25 Drawing Figures

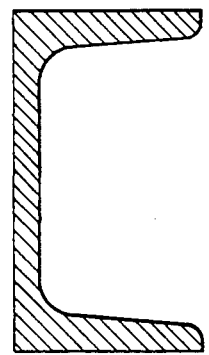
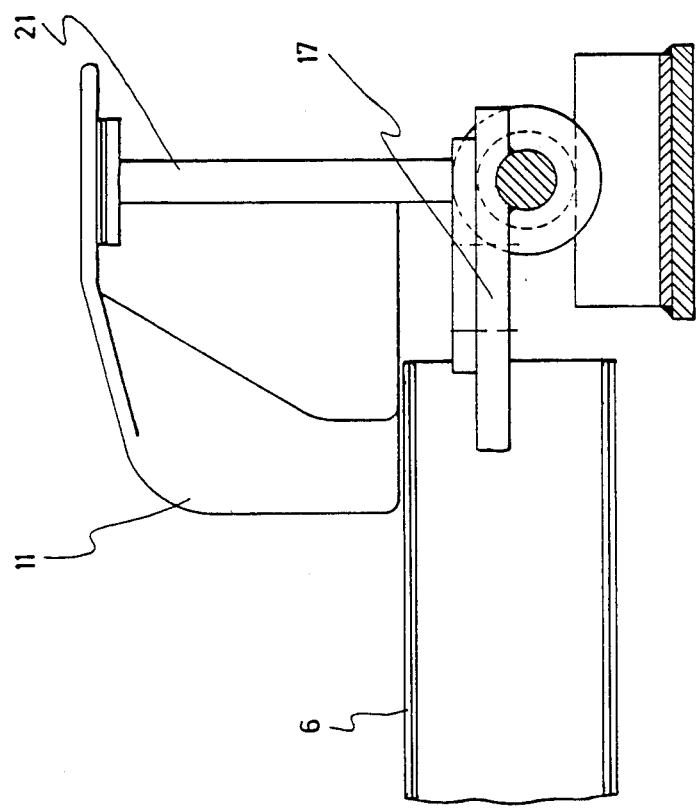
FIG.-9

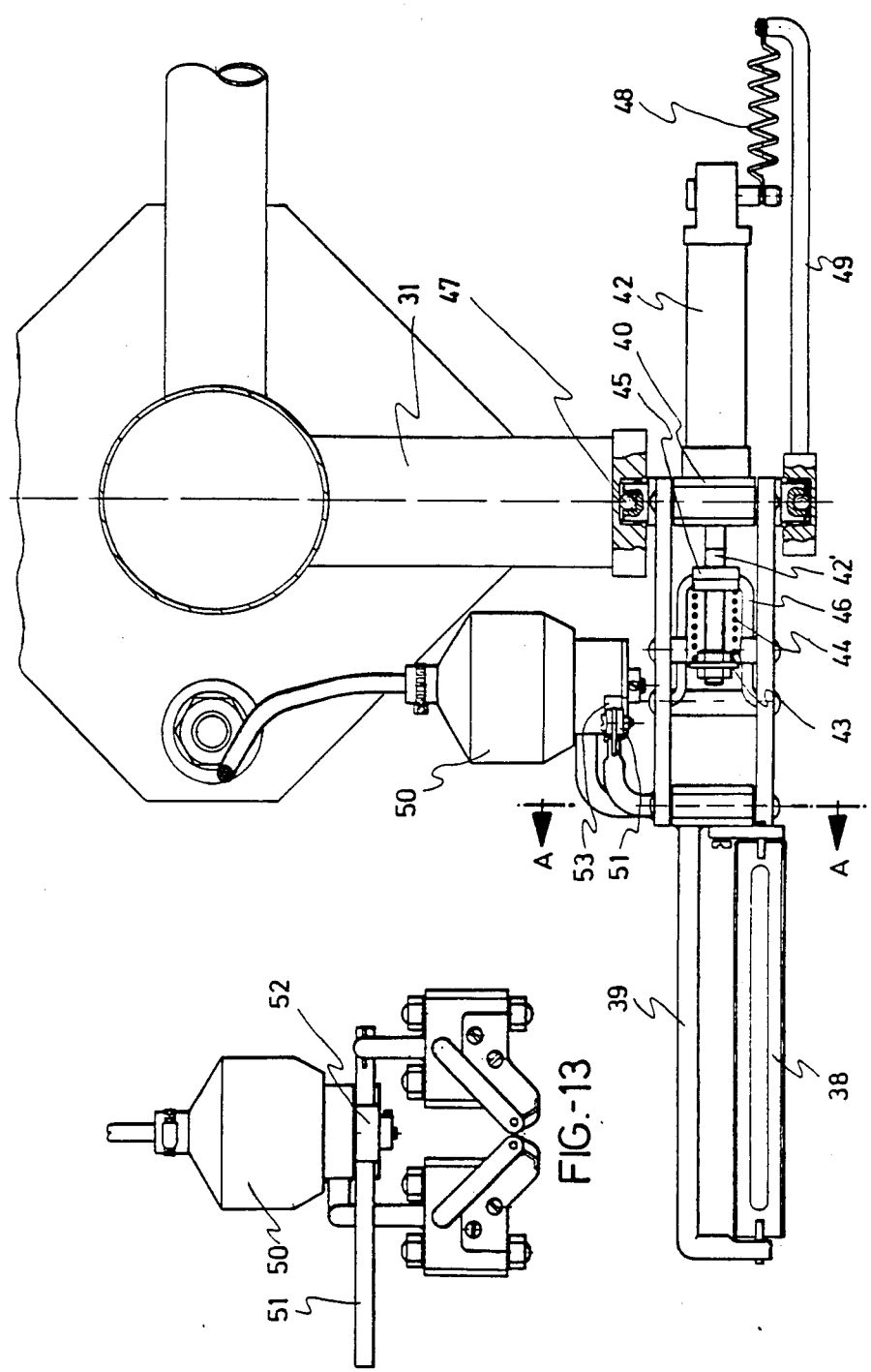

A-A

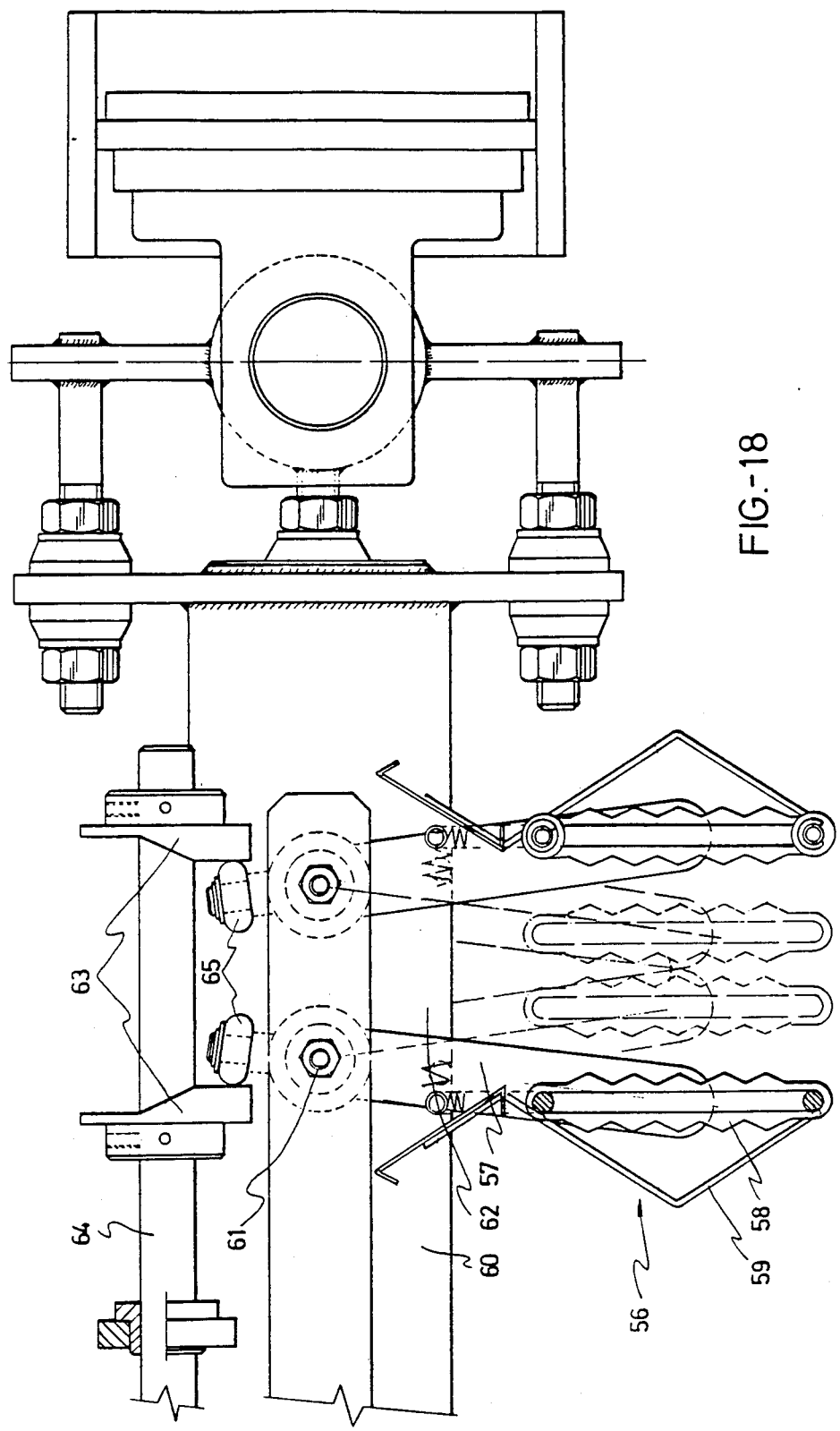

Y

APPARATUS FOR SIZING AND PEELING LONGATED CYLINDRICAL BODIES OF VEGETABLE MATTER

DETAILED DESCRIPTION OF THE INVENTION

The present invention, as follows from the title of this detailed description, relates to a method of sizing and peeling fruits, which is also suitable for carrying out a classification process following the peeling stage in the strict sense. The invention is applicable to a wide variety of fruits bearing similar characteristics as well.

As it is well known, the manufacture of white asparagus suitable for canned goods requires that the fruits be peeled, cut at the adequate length, scalded at some point in time during the process and then classified by size, prior to the packing operation, given that, as it is equally well known, the product as marketed is presented in cans or tins containing a group of asparagus having very similar dimensional characteristics, especially with respect to their transection.

In a fully manual manufacture, the workmen or workwomen receive the asparagus in boxes, inside which boxes the asparagus was transported following their picking, and, at the workbenches, the fruits likely to be processed are removed one by one, putting aside those fruits which, according to the instructions received, do not have the size or condition that will make them acceptable for human consumption. Once the fruits have been thus selected, their peeling is carried out manually by means of special "knives", different types of which can be found in the market, which consist of a sharp blade linked to a frame or support, which support likewise supports a penetration stop situated at suitable position and distance with respect to the edge of the blade. The knife-stop assembly is related to a shaft which may or may not be articulated thereto, and the said shaft is fixed to a handle, all of which constitutes a characteristic tool. The peeling operation consists of, whilst holding the asparagus with the left hand and keeping its tip between the fingers, making consecutive passes of the knife with the right hand in a longitudinal direction until such time as the entire surface of the fruit, at suitable depth, is peeled.

Each worker takes care of as many asparagus as he or she is supplied with, irrespective of their size, and, following the peeling operation, they are taken away from the workbenches and moved into a continuous water or continuous steam operated scalding vat, inside which the asparagus receives the thermical treatment required to correct its natural stiffness and to stop the enzymatic processes which take part in the deterioration of the organoleptic characteristics of the fruit, thus leaving the fruit ready for handling, without any harm, in the course of the subsequent classification, packing and weight control operations.

When the still unclassified asparagus leave the scalding vat, they are placed on long conveyor belts upon which act, at both sides thereof, the workmen or workwomen who carry out the task of selecting the asparagus and then placing them inside the can designed to that end. Each can should contain a number of fruits of the same size such as should be required to reach as closely as possible the net weight declared to the general public. Thus, while packing the goods, some kind of classification according to the diameter of the transection of the asparagus occurs, but, of course, due to the irregularities of the fruit, this visual classification cannot be accurate enough to guarantee that a fixed number of fruits grouped as homogeneous shall always render the same net weight and occupy the same volume. The packing operation is then completed with a second stage in which the previously obtained net weight is verified and corrected by either the removal of some fruits or the replacement of those same fruits by other fruits of a greater or smaller size, whatever the case may be. Therefore, the correct final weight, will unavoidably be obtained with asparagus of different dimensions, as far as their transections are concerned. Thus, it often happens that asparagus which could have easily reached a higher price in the market, if we considered the length of their transections, are found inside cans where their declared size is inferior and the price at which they are being sold is lower than it should have been, resulting in economic losses, sometimes a considerable amount, for the manufacturer.

The packing operation ends when the container gets closed by means of a semiautomatic machine and then is subjected to a sanitization process.

From the manual operating system described above follow extremely important inconveniences, among which stand out the cost derived from the manpower required for peeling the asparagus, the cost derived from the manpower hours required for the classification of the fruits, the lesser income resulting from overweight with incorrectly classified fruits, and other economic losses resulting from the fact that, due to the limitations set by the visual classification, errors are made in the evaluation of the size of the transection of the fruits (the Spanish Legislation uses the maximum diameter as the characteristic dimension) and these are sold as if they were smaller, while in fact their size is larger and the price paid should have been higher.

The Spanish Utility Models Nos. 237,554 and 224,870, which attempted to overcome the aforesaid problems, describe some partial solutions to the inconveniences explained above. In fact, these two Utility Models claim some devices peculiar to an asparagus peeling machine which help to solve the problem of the high costs derived from the manpower required for peeling the asparagus, but do not contemplate the possibility of properly responding to the classification needs, which are so strongly felt as necessary by the industry.

In addition to the solutions supplied by the said Utility Models, there are relevant problems derived therefrom which make the decision of using the machines which put them into practice a hard one to take. Thus, for instance, we could mention the importance of the product losses resulting from the peeling operation performed by means of the devices proposed by the said Utility Models, as well as the breaking of some fruits and the inconveniences derived from the positional situation of the feed system.

In more concrete terms, the feeding device described in the Utility Model No. 237,554 comprises, at its upper zone, a horizontal table provided with boxes inside which are placed the asparagus which, when said boxes rotate and adopt a vertical position, are caused to fall, by gravity, into the fastening mouthpieces. A mechanism of this kind requires, bearing in mind the described disposition of the rotatory support, being placed at the upper zone of the peeling machine, and, given the unavoidable dimensions of the remaining elements required for the peeling operation, this upper position of the boxes is found to be at remarkable distance from the surface upon which the assembly of the machine rests. This circumstance forces the workman in charge of feeding the fruits to stand over a platform in order to reach the boxes. As a consequence thereof, it is necessary to take up to that platform, situated at considerable distance from the floor, the cartons containing the fruits that will be processed, thus occupying considerable space and making the actions required for feeding raw materials very difficult, causing significant trouble and sizeable costs.

As it can also be provided, in the mechanism described in the aforesaid Utility Model as ideal for peeling the fruits, which has articulated arms disposed with the possibility of rotating against a spring, said structure brings about important limitations when using these machines.

In this sense, the tension of the spring against which the oscillation of the knife-supporting arms is carried out, when said arms are opened, also constitutes the force which causes the approach movement which must take place prior to each peeling pass and furthermore constitutes the force needed to compress the knives against the fruit, thus causing a suitable removal of the skin. If the spring is thus controlled to carry out this last operation suitably, it usually happens that the spring supplies the knives, on their approach to the asparagus, with a displacement speed such that, when the two elements come into contact, the knives will hit the fruit hard, shearing same with its cutting edge, with the result that the asparagus will be broken and the price of the fruit will thus be lowered, sometimes more than what an economic exploitation of the proposed solutions would allow.

This simultaneity of functions of the spring with which the knife-supporting arms of the mechanism described in the aforesaid Utility Models are furnished, entails that, when the fruits to be peeled present transactions whose normal projections are displaced from the projections corresponding to the sections where the fruit is fastened by means of the retaining mouthpieces, one of the arms will be forced to slide along the outer surface of the asparagus, at the same time as, through the cooperation of the spring against which it opens, it forces the second articulated arm to rotate until the opposite surface of the asparagus is reached, thus producing, throughout the peeling operation, a bending moment on the fruit, which fruit serves as a supporting element, in accordance with the characteristics of a spring which has been designed for another main function, specifically that of ensuring that the fruit is peeled, and which could exceed what is required to cause the tearing of the fruit.

All of these inconveniences, together with several other which will be described later on, in the course of the present description, specifically when alluding to the parallel positions of the knives which constitute one of the basic characteristics of the asparagus peeling machine proposed in the invention, make it necessary for us to offer a previous classification of the fruits by size, such that each type will be processed in those machines whose knife-supporting articulated arms are activated by a spring calculated and regulated in accordance with the stress range that the fruits can bear without breaking or being subjected to excessive peeling. Thus, if the solutions proposed by the said Utility Models are to be applied, the previous classification of the fruits, which entails high investments, will be required.

Anyway, given that the springs likely to be used normally cause weak tensions, if we wished to avoid the inconveniences pointed out before, this multifunctional element would require using readily penetrating knives that would not demand excessive stresses therefrom, notwithstanding that the simple effect of the descent velocity of the knives brings about unwanted excessive penetrations produced by the cutting edges, similar to those penetrations that Utility Model No. 252,284, the inventor of the two Utility Models being one and the same person, tries to avoid. All of these problems render considerable losses, the reduction of which, objective which will not be quite obtained, demands the adjustment of the distance existing between the cutting edges and the penetration stops with which the knives are furnished.

These limitations, inconveniences and drawbacks are perfectly well solved thanks to the special structural and functional characteristics of the asparagus peeling machine which constitutes the object of the present invention.

Basically, and in accordance with a preferential example of practical construction, the claimed machine comprises a central drum provided with four longitudinal rows of retaining mouthpieces, said rows being phased out 90° with respect to one another. The said drum is affected by an intermittent oscillating movement, the amplitude of each oscillation also being 90°, in a manner such that, at every stop position, each of the respective rows of retaining mouthpieces will consecutively be situated in a front position, within a horizontal plane, in an upward position, in a rear position, and in a downward position, the front row corresponds to the loading zone of the drum, the upper row corresponds to the peeling zone, the rear row corresponds to that zone where the previously peeled asparagus are extracted, and the lower row, though rendered inoperative, completes a sequential cycle thanks to which the machine simultaneously achieves three different operations which constitute the whole peeling process.

Also in accordance with an example of practical construction, each said row may be constituted by fourteen retaining mouthpieces. The number of the mouthpieces may be changed at will without having an effect on the essence of the invention.

Each one of the retaining mouthpieces, designed to receive and fasten one asparagus by its end encompassing the tip of the asparagus, such that the workman may reach same easily, has a deformable liner which together with the body of the mouthpiece configurates a swellable chamber likely to strangle itself over the tip of the asparagus, and bind it. The said chamber is filled by means of an electric valve activated by the microprocesser that controls the operation of the machine.

In order to facilitate the access of the asparagus into the corresponding retaining mouthpieces, there are established, in correspondence with each said mouthpiece and situated at the front zone of the machine, two conveyor belts. Each one of said conveyor belts is enclosed by two canalizing elements which establish a wide zone for the manual deposition of the asparagus and which converge towards the retaining mouthpieces, thus ensuring the penetration of the asparagus therein, as it is being pulled by the corresponding conveyor.

As soon as all of the asparagus corresponding to a row have been fastened by the corresponding retaining mouthpieces, the drum rotates 90°, thus permitting the asparagus, which have come into said drum within an imaginary horizontal plane, to remain situated within an equally imaginary vertical plane, in order to carry out the peeling stage in the strict sense.

To that effect, the machine has, at its upper zone, two carriages operable by the corresponding pneumatic cylinders, one of the carriages being vertically slidable on guides associated to the bedplate of the machine and being designed to cause movements of the knives such that they will be in a coaxial position with respect to the very asparagus being peeled, while the second carriage is displaceable in a transversal direction with respect to the first carriage and it has been designed to achieve both the approach and recoiling motions of the knives with respect to the asparagus and within a horizontal plane. Specifically linked to this second carriage are the true peeling means which consist of a pair of parallel knife-supporting arms, which support corresponding knives, said arms being associated to a common support and sliding such that they will move toward and away from each other thanks to the cooperation of a pneumatic microcylinder. In more concrete terms, the said microcylinder is hinged to the aforesaid support and acts upon the arms through the interposition of a spring, in a manner such that, through the adequate adjustment of the flow of the microcylinder, we will be able to adjust the velocity at which the knives approach the asparagus, ensuring that the action of the knives on the asparagus will not cause the shearing thereof, thus determining a sufficiently soft action of the knife. At the end of its path, the microcylinder loads the spring and it is the deformation thereof, which happens to be proportional to the diametrical quota of the asparagus, what causes the knives to be pushed against the asparagus during the cutting operation, thereby achieving a high degree of operational uniformity in the presence of asparagus having substantially different diameters with respect to each other.

As stated above, one of the essential characteristics of the peeling machine proposed in the present invention is based on the fact that the knives "attack" the asparagus keeping a situation of constant parallelism between the two knives. To that effect, the microcylinder and, more specifically, the spring acts upon an element open-worked on the rod itself of the microcylinder, on which element are hingedly mounted two forks which respectively act upon the two knife-supports, but with the peculiarity that each said knife-supporting arm is related to the common support through a pair of auxiliary arms which, together with the knife-supporting arm and the support, form a deformable parallelogram when the corresponding fork acts upon same, thanks to which the knife-supporting arm is displaced, maintaining its perpendicularity with respect to the support and, consequently, maintaining its parallelism with respect to the other knife-supporting arm, that is to say, keeping the said knives in a situation of permanent parallelism with respect to each other.

This structure allows optimum results when it comes to avoiding the tearing of fruits and the product losses caused by the excessive penetration of the knives during the peeling stage, hopefully solving the significant problems existing with the conventional technique. Particularly thanks to the design of the cutting elements described above, we can make the mechanism which causes the approach motion of the knives independent from the mechanism causing the variable grip of the knives over the asparagus and equally independent from the mechanism of adaptation of the coordinated movement of the knives and their support, in a horizontal plane, to the configuration characteristics of each individual asparagus.

In a more concrete manner, as it has been stated above, one of the advantages of using two knives is that, when we rotate the retaining mouthpieces so to cause the successive cutting passes required to achieve the peeling of the entire perimeter of the fruits, the said cutting passes will always take place according to opposed and parallel chords, in a manner such that, if the selected angle of rotation happens to be a whole divisor of 180°, a new cutting will never superimpose a previous cutting, as we avoid that situation where the zone of the asparagus previously peeled by one knife is also peeled by the other knife. On the other hand, this same problem cannot be avoided if we use a system having arms hinged at one point and which form some kind of angle between them when acting upon the asparagus, as it is the case with the conventional technique when the rotation angle of the fruit is lower than its supplementary angle, as it must forcefully happen if we attempt to peel the entire perimeter of the asparagus in just one rotation of the retaining mouthpiece. When the second cutting pass takes place, the knife will not remove skin but rather pulp of the fruit with the consequent loss of efficiency, which forces the workman, especially if small asparagus are being processed, to peel the fruit with just one knife and the aid of a support plate held on the other arm. In this particular case, it will be necessary for the manufacturer to employ a single-purpose machine for each specific group of sizes and, additionally, the fruits will have to be classified prior to the peeling operation.

Apart from that, in the machine proposed by the invention, the tightening effect on the asparagus is obtained through the tension provided by the deformation of the spring, and the length thereof may be selected such that, in accordance with the length of the run of the cylinder, a deformation of said spring will not be produced if the knives do not find any obstacle during the approach movement. In the opposed case, the knife-supporting arms and the knives themselves would continue to approach, driven by the action of the pneumatic minicylinder, until they contacted the surface of the fruit and, from that moment onwards, they would be prevented from moving further, whereas the rod of the cylinder would continue to move, compressing the spring until its path is completed, which results in the deformation of the spring and, consequently, also results in a stress on the said asparagus propertional to such deformation.

In accordance with a further object of the invention, meant to be an additional preventive measure to avoid excessive stresses to the fruits during the peeling operation and thus prevent them from collapsing, there has been provided that the retaining mouthpieces be capable of adopting a somewhat lateral inclination. In this sense, each retaining mouthpiece in the strict sense is mounted on its corresponding rotatory tree associated to the drum, with the cooperation of a spring which permits a certain lateral inclination of the mouthpiece, such that the said spring will absorb any potential stress laterally supplied to the asparagus.

In accordance with one another characteristic of the invention, the asparagus peeling machine takes advantage of the ideal position of the knives during the peeling operation and carries out the sizing of the asparagus with a view to their subsequent classification. In this sense, the supporting arm of one of the knives hingedly receives a small rack which, with the cooperation of a guide associated to the other knife-supporting element, permanently gears a pinion or toothed roller hinged to the shaft of a sizing element, specifically that of a transtructor such as the slide of a potentiometer, the core of a coil, the disk of an incremental encoder or any other adequate element. In accordance with the aforesaid preferential example of construction, an incremental encoder has been selected, upon the shaft of which acts the said rack, in a manner such that the approach or separation of the knives results in a rotation of the shaft of said encoder in one or another direction, which will describe an arch whose amplitude will depend upon the magnitude of the linear displacement of the arm and of the rack-pinion transmission ratio. At the electrical outlet of the encoder it will then be possible to record as many impulses as it will correspond to the magnitude of the transmission ratio displacement, and the number of pulses per turn which are peculiar to the encoder employed.

The mechanisms of the nipper force the knife-supporting arms, prior to the start of the movements required to complete each peeling pass, to remain permanently opened and in the same position: the position of maximum opening. It is at this very point that we should start counting the pulses emitted by the encoder until such time as the knives will stop by the fruit, which is supposed to happen after a sufficient amount of time from the start of the approach movement of the arms has elapsed. The number of recorded pulses will increase if the diameter of the fruit being processed by the knives is decreased. Once the abovementioned amount of time has been spent, measured by the control unit with which the machine has been furnished, the knives will start their ascending motion and consequently the peeling action starts, such that movements toward and away also result in angular displacements of the encoder, thus generating pulses that will be added to or substracted from those which correspond to the initial displacement. Thus, we will obtain the measurement of a transversal section each time the microprocesser furnished to the central unit reads the number of pulses which has been recorded on the memory after a certain fraction of time.

The microprocesser operates by counting the pulses and transforming them into measuring units and further assigning the fruit being "watched" on each occasion to one of, for example, some twelve different classes or types and storing this piece of information until such time as the classification process, which will be explained later on, takes place.

At the rear zone of the machine, in correspondence with that row of retaining mouthpieces which are found in a loading position, there are established a plurality of extracting nippers, which numerically and positionally correspond to the retaining mouthpieces of the aforesaid row, all of these nippers being mounted on a common carriage, which can be displaced rearwardly if activated by a pneumatic cylinder. Each said nipper is structured on the basis of two hinged arms which are opened with the cooperation of a small cylinder acting upon a rack, which rack acts in turn on a pinion keyed to a shaft, upon which shaft are mounted, integrally pierced, a plurality of cams which, in pairs, act upon each pair of arms corresponding to each nipper, more specifically through respective rollers established on the ends of said arms, opposed to the nipping ends, there existing springs which tend to keep the arms of each nipper in a closing position.

The microprocessor is aware of the position within the machine of both said nipper and said retaining mouthpiece, and, therefore, there is assigned to each fruit not only the code number which corresponds to its specific size, according to the selection criterion used, but also the exact location within the general context of the machine.

When these nippers fall upon the asparagus and complete their grip, the retaining mouthpieces release the asparagus and the carriage slides backwardly taking them up to a bucket chain, situated in an upper plane, upon which buckets the asparagus are to be deposited, in a manner such that they may keep their independence and positional order, since there is a perfect correspondence between the number of nippers and the number of buckets in the chain which are placed underneath the extraction carriage.

Once a certain period of time has elapsed, likewise measured by the control unit, the bucket chain starts its motion towards a space where a series of duly positioned collectors are located, the number of which coincides with the number of classes or types foreseen for the classification of the asparagus. Given that we know the diameter of each asparagus and the exact place where it is located, if the speed of the chain is also known, we will be able to ascertain the amount of time that passes from the extraction zone of the drum to the expulsion or sizing zone, that is to say, we will be able to ascertain the number of passes of the chain required to go from one situation into the other. The microprocessor which counts, by means of conventional probes, the number of passes from the moment the chain starts to move, can also order the opening of each bucket, at the moment the specific bucket passes over the collector which corresponds to the size of the asparagus in question, thus causing a grouping of the asparagus having the same size in each said collector, after which the already classified asparagus may be removed by means of any conventional system.

In more concrete terms, each one of said buckets is constituted by two elements, a first rear element, which is fixed, and a second front element, which is lowerable, in a manner such that the lowering of this second element determines the opening of the bottom part of the bucket and causes the corresponding asparagus to fall into the collector. In order to do so, the shaft corresponding to the movable piece is lowerable by the action of a spring which releases a trigger, furnished with a roller, when said roller is deprived from the support provided by a guide extending all along the upper path of the buckets. The said guide, at the zone where the asparagus are expelled or removed, is divided into regular sections which give rise to a series of cam-operating lengths, each of said cams sliding downwardly, with the cooperation of a pneumatic microcylinder, so to cause the opening of the bucket. The said pneumatic cylinder is activated by means of an electrovalve which is controlled from the microprocesser in the control unit of the machine, specifically when the bucket holding an asparagus of certain characteristics is facing the corresponding collector.

Finally, it is worth mentioning, as a special characteristic of the invention, that the machine is furnished with means for cutting the asparagus, following the levelling thereof, by its end encompassing the tip of the fruit, which is carried out with the cooperation of a knurling oscillating cylinder, which friction-pulls the asparagus, according to its longitudinal shaft, and leads them to a conveyor belt running at the same speed as the bucket chain, such that the cutting is completed with the cooperation of two disks, the first disk being situated at a fixed distance, say 155 mm., from the end of the conveyor, that is to say, from the tip of the asparagus, and the second disk being situated at an equally fixed distance, say 55 mm., from the first disk, in a manner such that the first cutting disk will establish the definitive length of the asparagus likely to be packed, whereas the second cutting disk is designed to obtain shoots of identical size which can be exploited profitably and constitute a sub-product likely to be sold in the market under normal conditions.

BRIEF DESCRIPTION OF THE DRAWINGS

To complement the present detailed description and for a better understanding of the characteristics of the invention, as an integral part thereof, reference is made to the accompanying drawings which, in an illustrative and non-limiting manner, show the following:

FIG. 9 is an enlarged close front elevational view of one of the aforesaid canalization partitions, duly related to the conveyor belt.

FIG. 12 is a side elevational view of one of the cutting devices fitted with its various accessories.

FIG. 13 is a front elevational view of the device of FIG. 12.

FIG. 18 is a close plan view of one of the extraction nippers, used for extracting the previously peeled asparagus, associated to the corresponding carriage, including the actuating mechanism of said nipper.

DETAILED DESCRIPTION OF A PREFERRED EMBODIMENT

Figure 1:
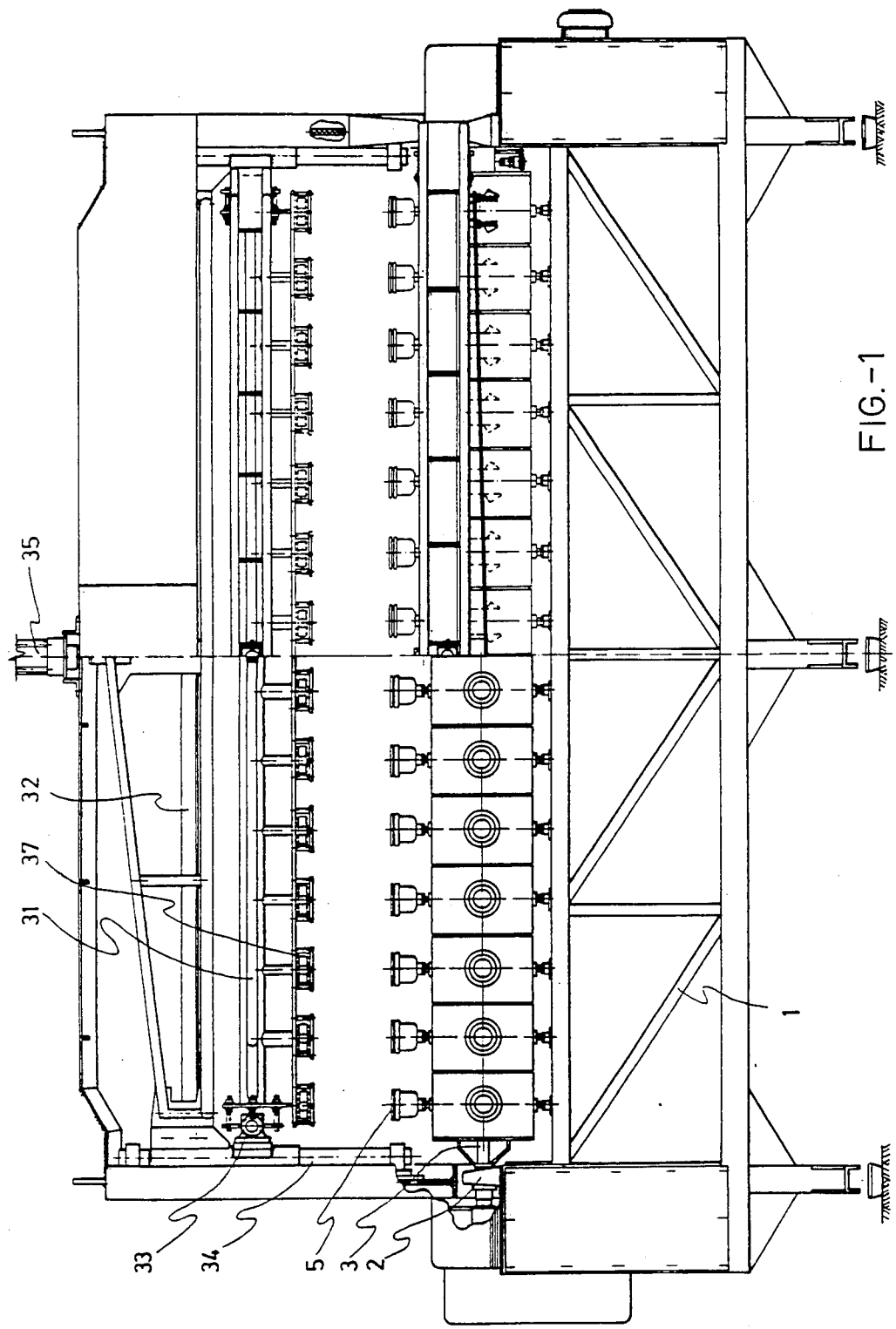
FIG. 1 is a general front elevational view of an asparagus peeling machine according to the object of the present inventionl.

Referring to the drawings, it will be seen that the asparagus peeling machine of the invention is constituted by a bedplate or chassis 1 on which is mounted, with the cooperation of extreme bearings 2, the shaft 3 corresponding to the oscillating drum 4 upon which are mounted four longitudinal rows of retaining mouthpieces 5 destined to keep the asparagus fastened by their tips throughout the peeling process.

Figure 7:
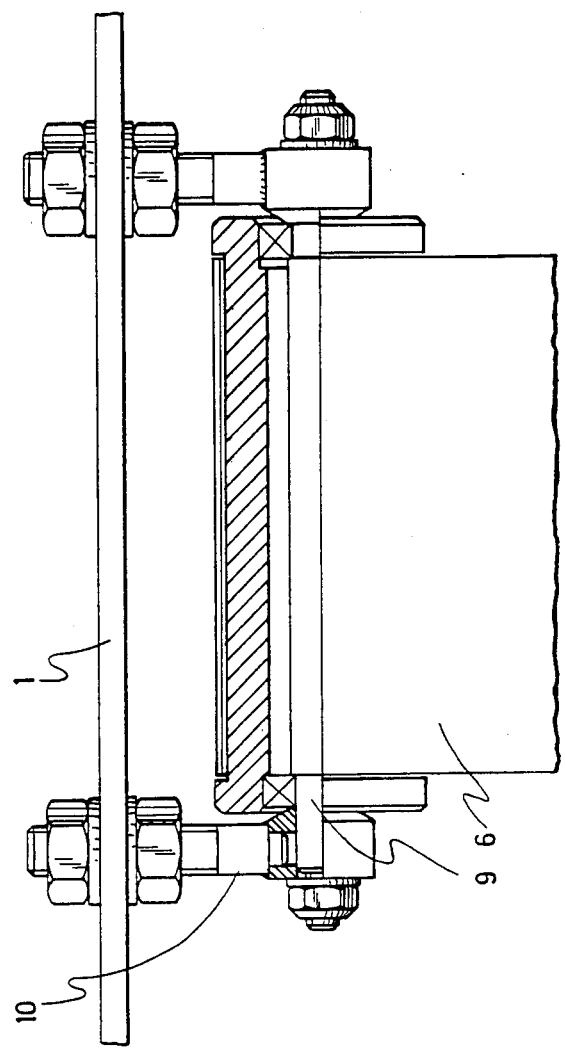
FIG. 7 is an enlarged close view of one of the free rotation axes which causes the backward motion of the conveyor belts.
Figure 8:
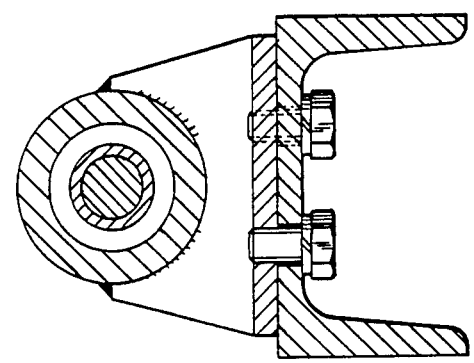
FIG. 8 is a close cross-sectional view of the assembly of FIG. 7.

To facilitate the feed of the machine, the machine has, at its front zone and at a suitable height, a number of conveyor belts 6 the upper and operating surface of which advances towards the retaining mouthpieces 5, wherefore all of the conveyor belts 6 are mounted on a shaft 7 which oscillates driven by a gearmotor 8, whereas, at the zone opposite to said shaft 7, there is established for each one of said belts 6 a freely oscillating shaft 9 mounted on arms 10 which relate said shaft 9 to the chassis 1, as clearly illustrated in FIG. 7.

Figure 2:
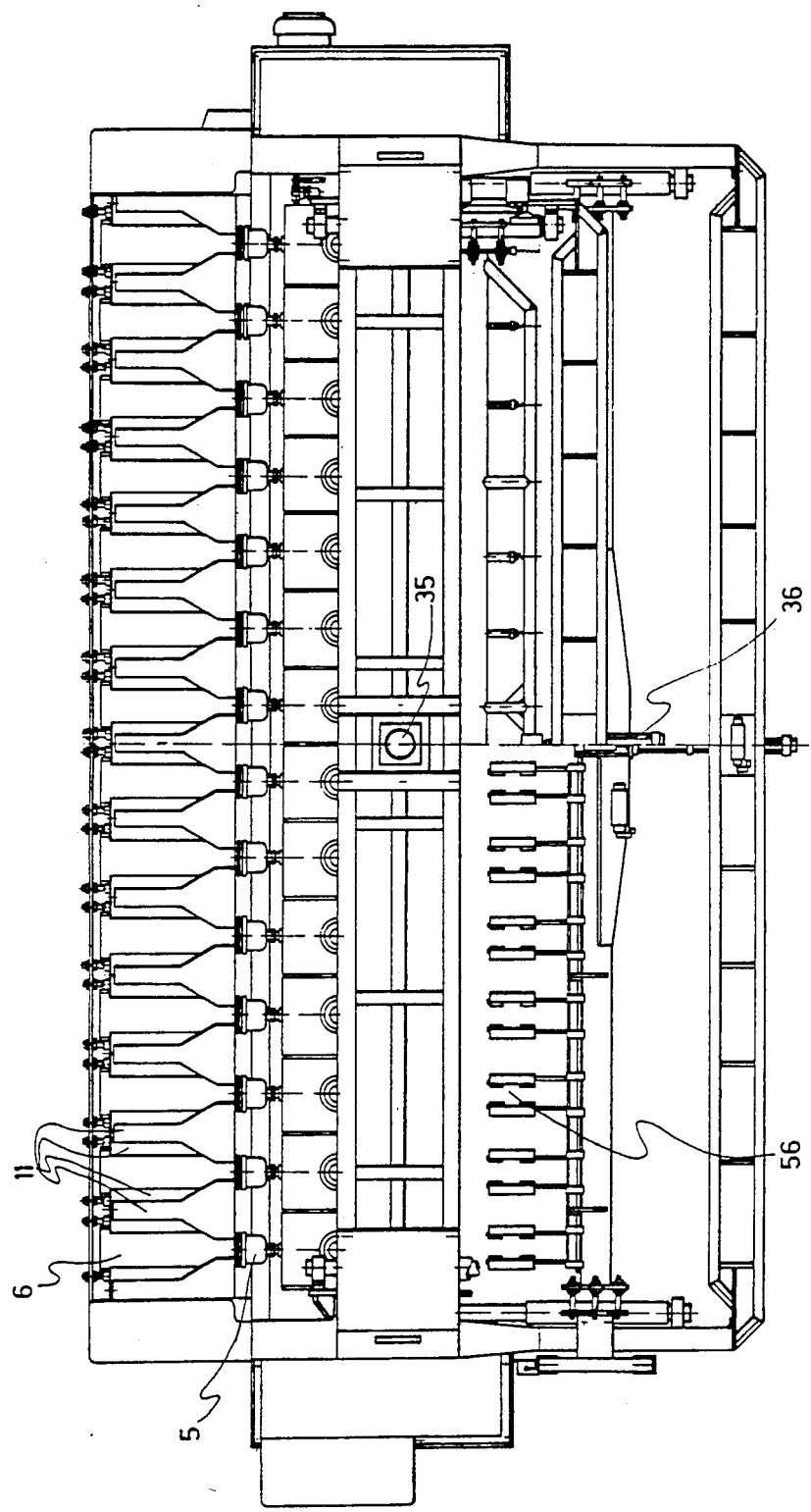
FIG. 2 is a plan view of the machine of FIG. 1.
Figure 3:
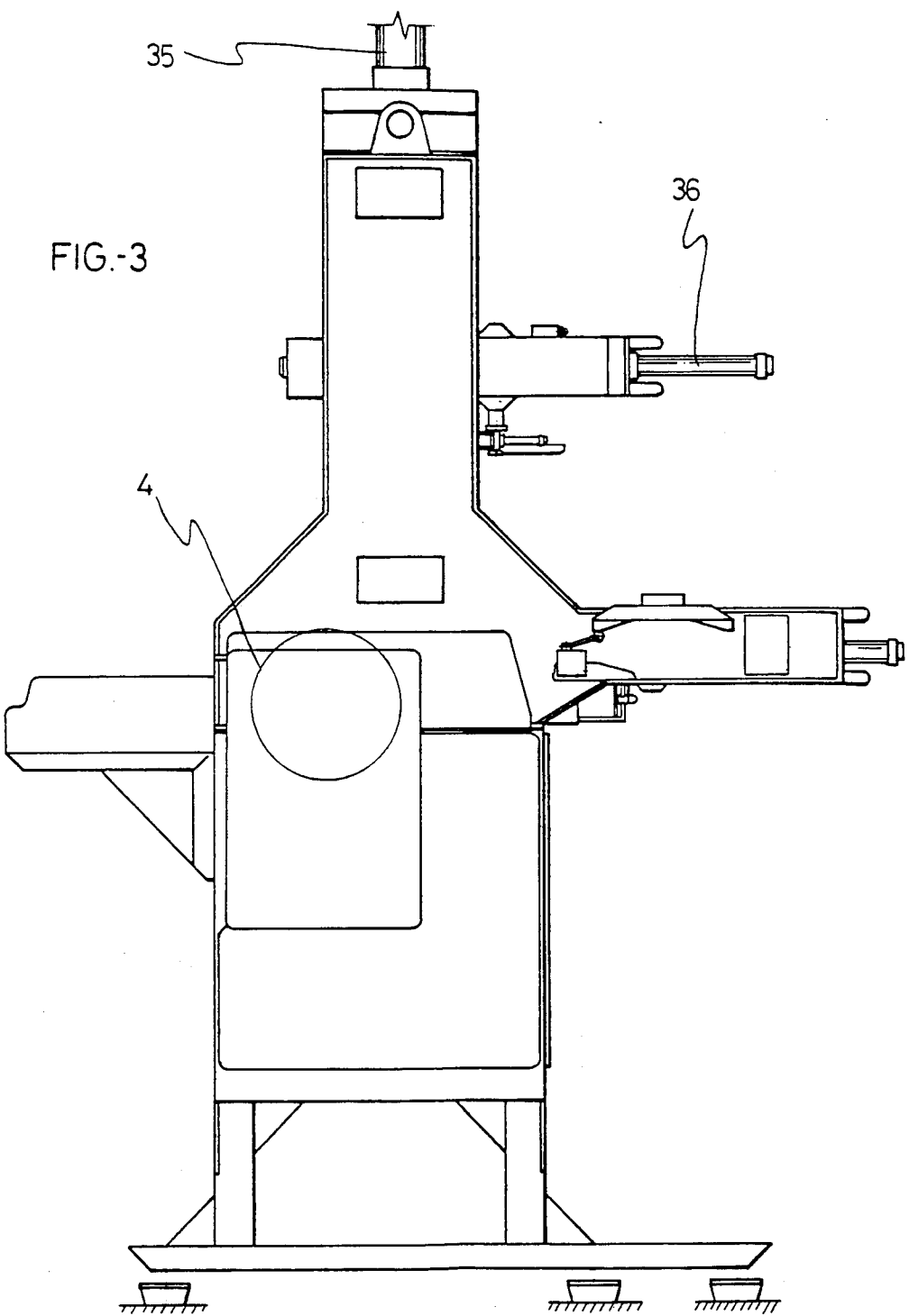
FIG. 3 shows a profile.
Figure 4:
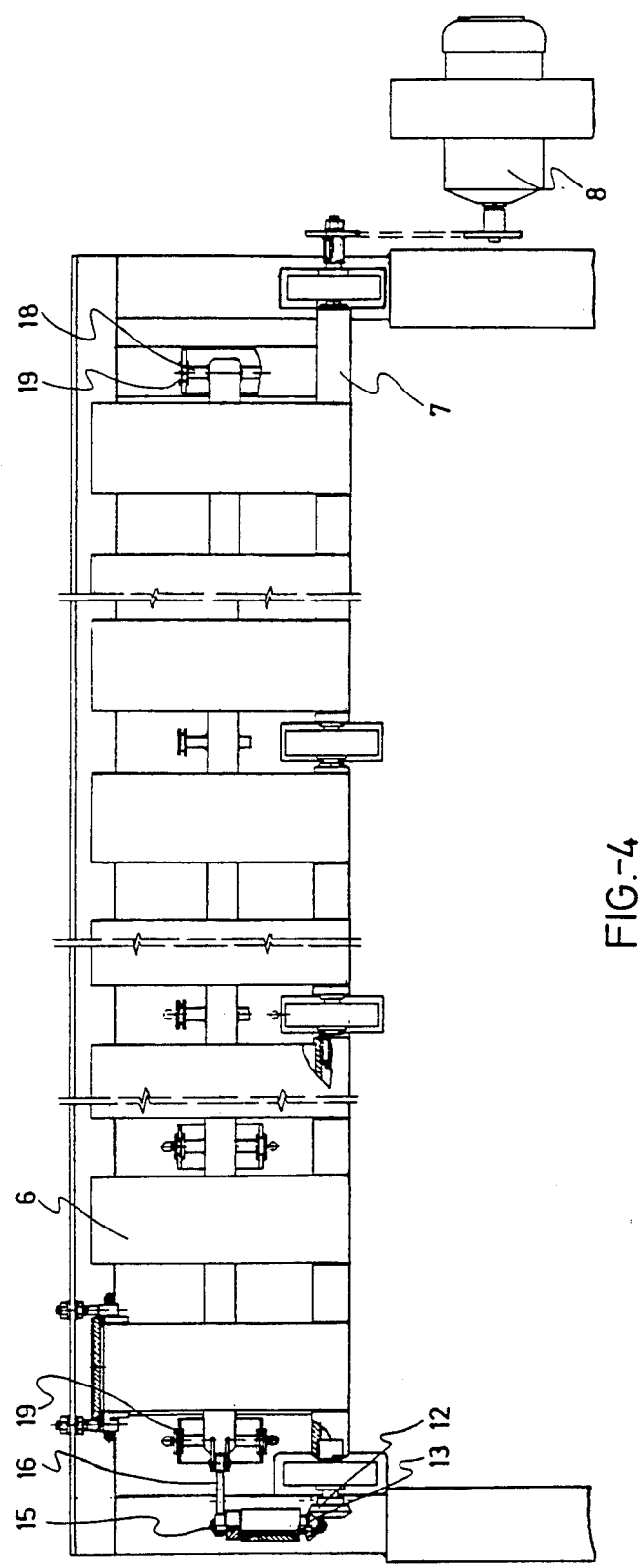
FIG. 4 is a close plan view of the asparagus feeding zone, wherein the devices which activate the conveyor belts are illustrated.
Figure 5:
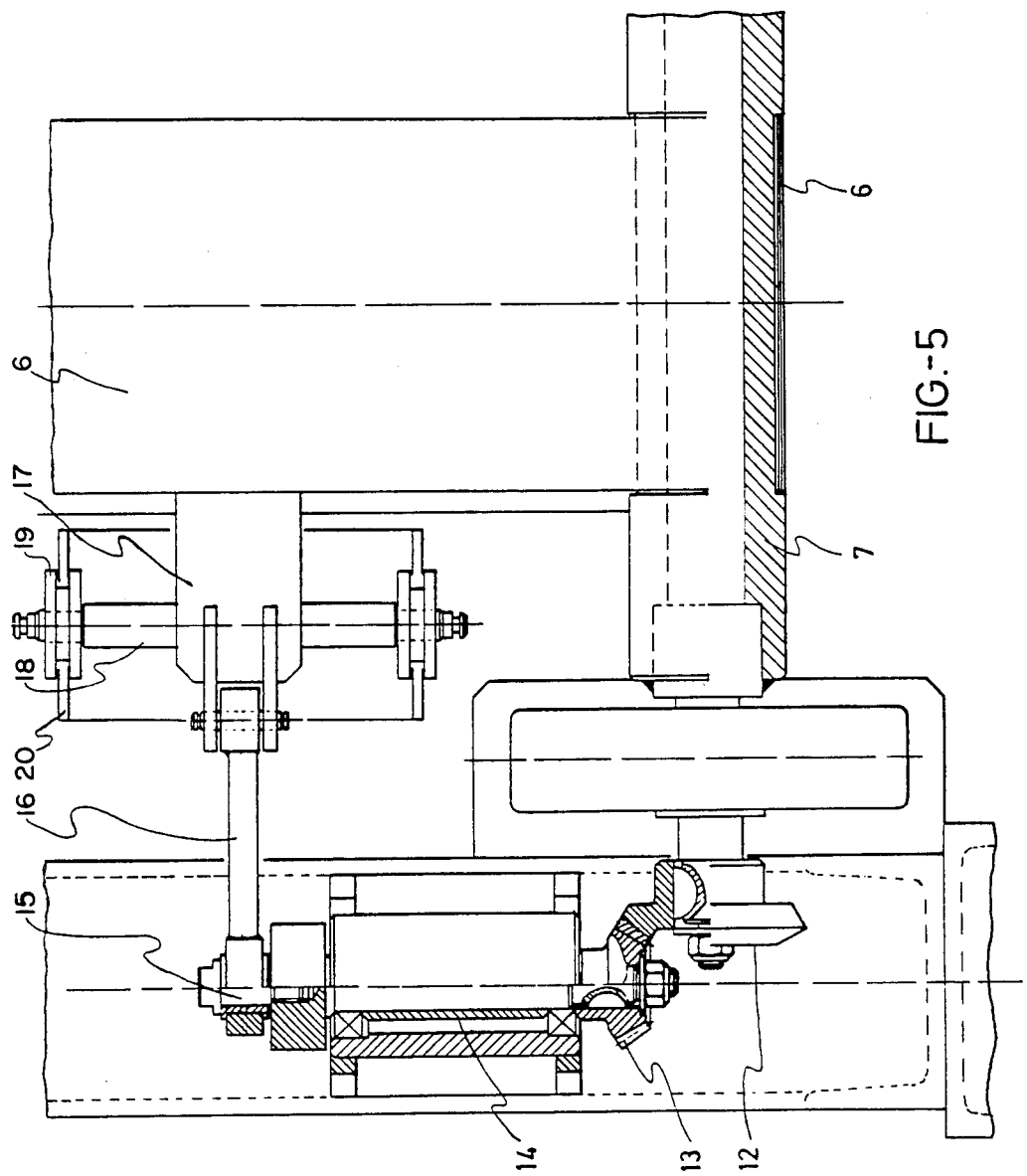
FIG. 5 is a close view of the actuating mechanisms which supply the lateral oscillating motion to the lateral canalization partitions.
Figure 6:
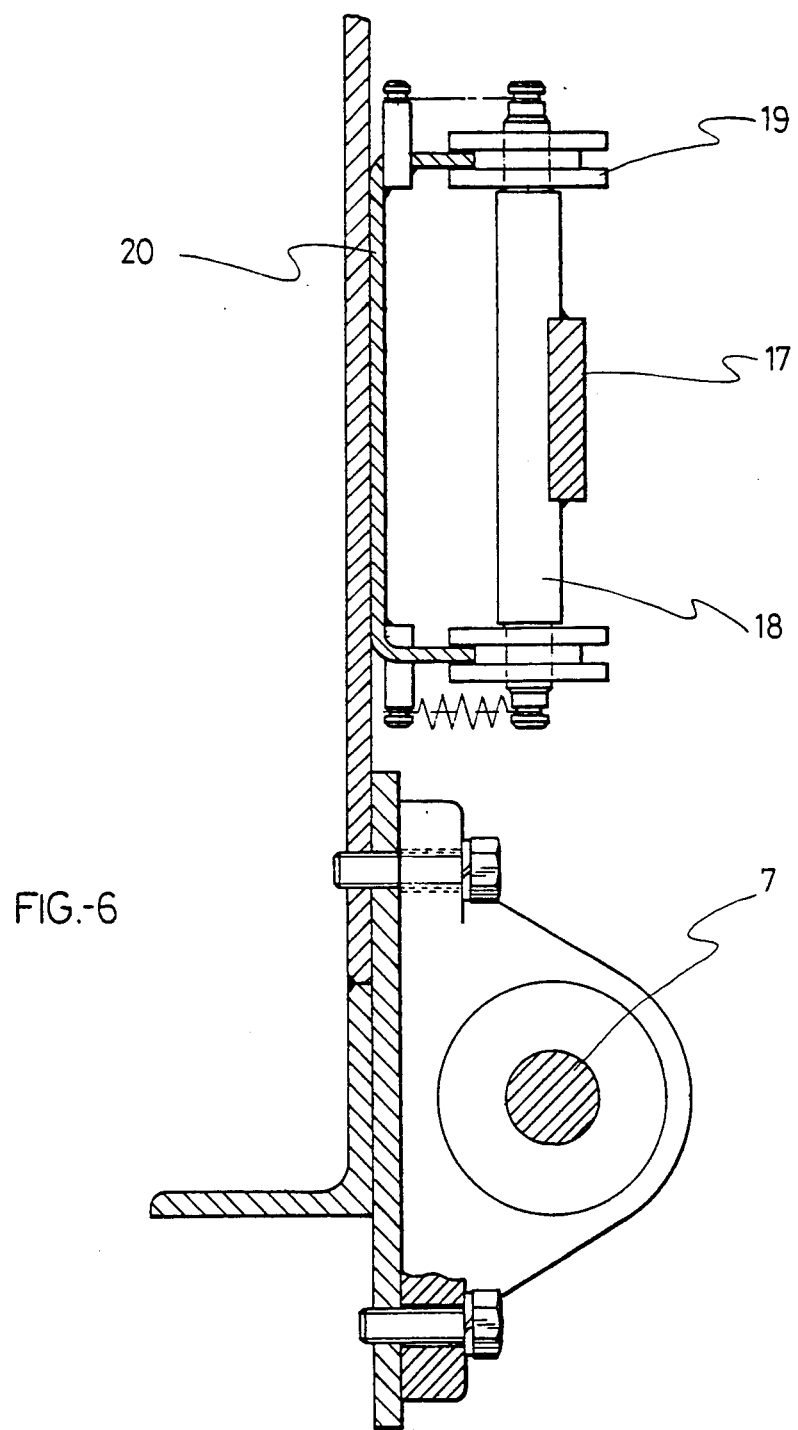
FIG. 6 is a close cross-sectional view of the aforesaid feeding zone, showing the sliding rollers associated to the said canalization partitions.

Obviously, according to what is depicted in FIG. 2, each conveyor belt 6 operatively faces one of the mouthpieces 5. Moreover, on each side of said conveyor belts, there are established corresponding canalization partitions 11 which, as it is likewise clearly illustrated in FIG. 2, define a wide surface for the manual deposition of the asparagus, which turns this operation into an easy one. Further, at a later stage, due to the pulling action of the corresponding belt 6, said partitions will perfectly center the asparagus on the retaining mouthpiece 5.

To facilitate this operation, the pieces or partitions 11 are capable of producing a lateral vibratory motion, caused by the very shaft 7 which drives the conveyor belts 6. On one end of said shaft 7 there is situated a bevel pinion 12 that gears into a second pinion 13 corresponding to an auxiliary shaft 14, equally mounted on bearings, at the opposite end of which is established an eccentric 15 which, through a connecting rod 16, causes the movement of an element 17 supporting all of the partitions 11, said element 17 being provided with transversal shafts 18 having rollers 19 on the ends thereof, through which rollers the said element slides on cams 20 of the bedplate 1.

Thus, the asparagus are subjected, parallel to the forward movement leading to the mouthpieces 5, to a certain concentration caused by the partitions 11 which, jointly with the vibratory or oscillating motion in the lateral direction of such partitions, determine a perfect centering on the mouthpieces.

Figure 10:
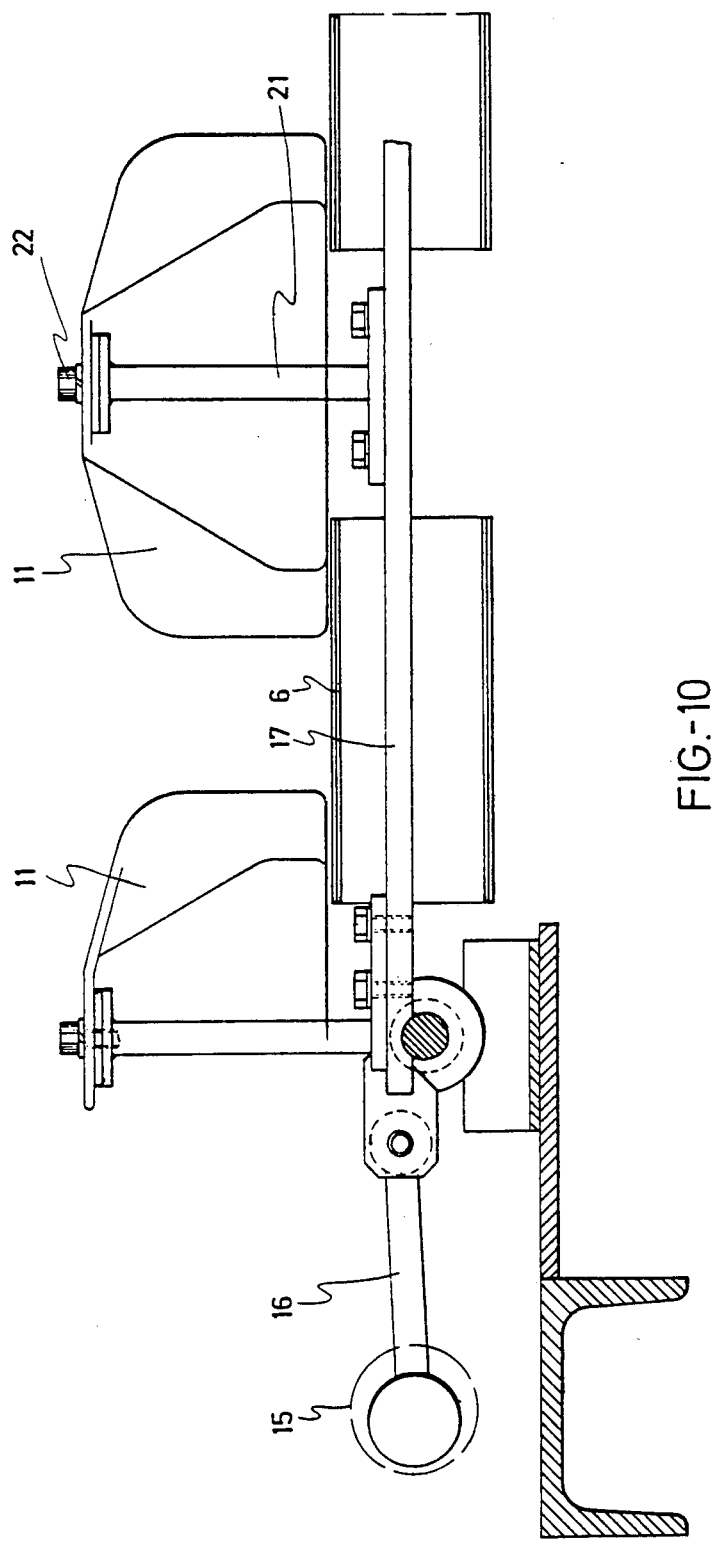
FIG. 10 is a close front elevational view of the feeding zone of the machine, which shows, in addition to the canalization partitions, the connecting rod which causes the alternating motion of both the said partitions and the conveyor belts placed between them, which are cross-split.
Figure 11:
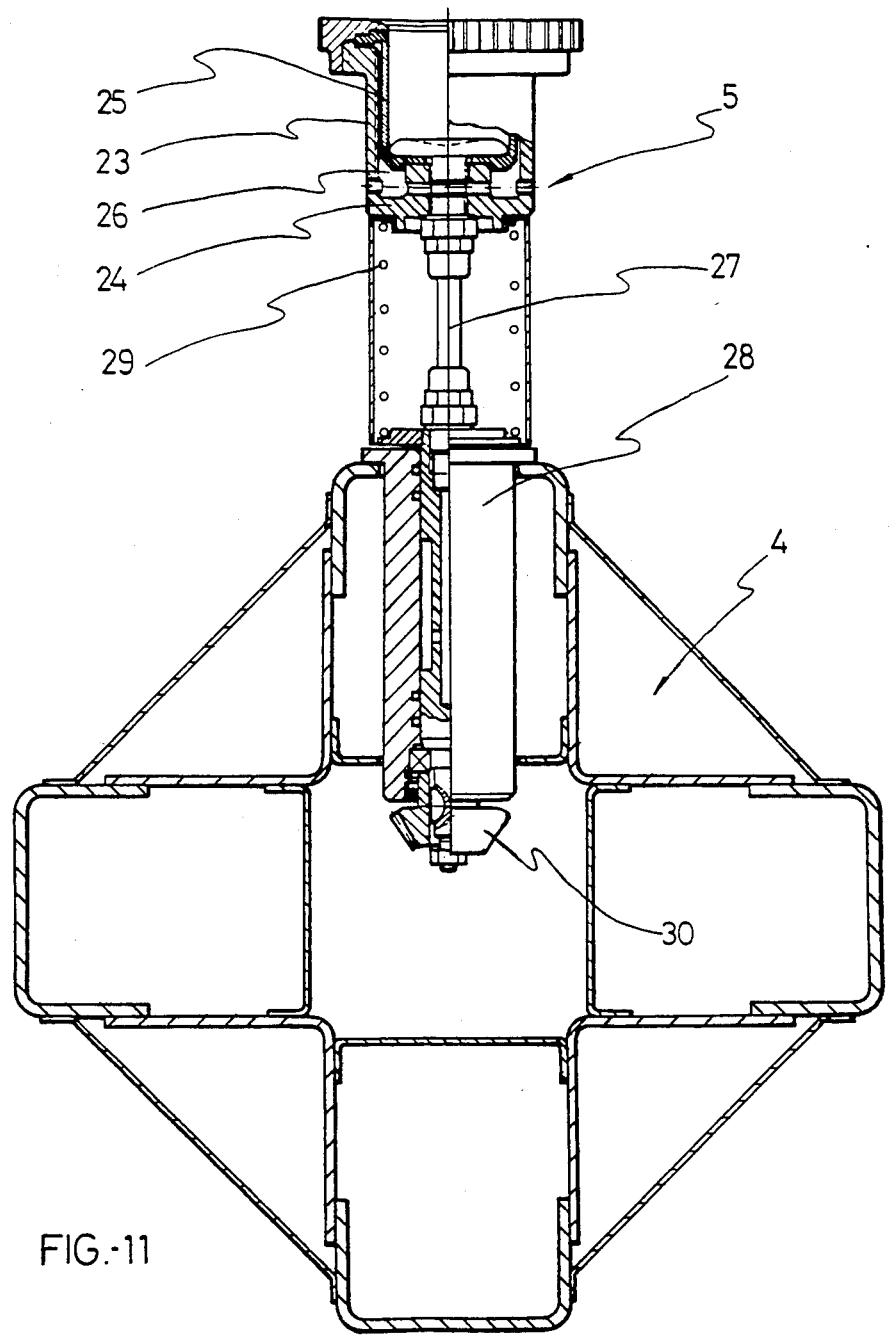
FIG. 11 is a cross-sectional view of the drum, wherein a detail of one of the retaining mouthpieces is also illustrated.
Figure 17:
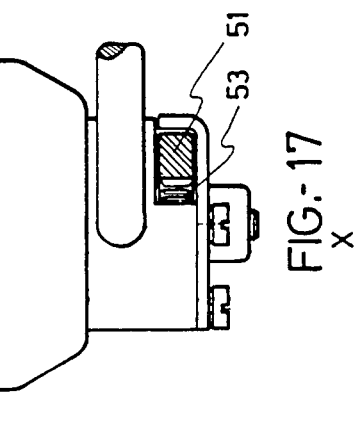
FIG. 17 is a close side elevational view of the aforesaid encoder observed according to the arrow illustrated in FIG. 16.
Figure 16:
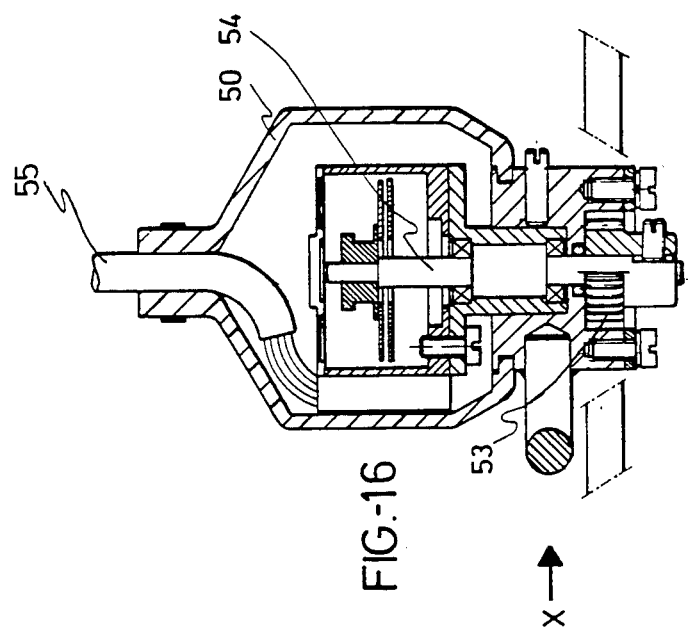
FIG. 16 is an enlarged close sectional view of the incremental encoder which cooperates with the cutting knives.
Figure 14:
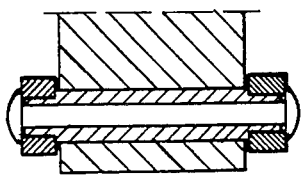
FIG. 14 is a close cross-sectional view of the device illustrated in FIG. 12 along line A—A of that same figure.

In more concrete terms, the convergence partitions 11 are fixed to the common support 17, as illustrated in FIG. 10, by means of auxiliary ties 21 and with the cooperation of corresponding nuts 22.

As for the retaining mouthpieces 5, they are constituted by means of a rigid bushing 23, having a closed internal base 24, inside which bushing is established a liner 25 of identical concentration which, together with the bushing 23, defines a chamber 26 that can be swelled through the pressurized air received from the flexible whip-like element 27 and with the cooperation of the corresponding valve, such that the flexible liner 25 strangles itself over the tip of the asparagus and binds it.

The feeding element 27 is of a flexible nature, wherefore it is provided that the bushing 23 be mounted on the rotatory tree 28 through a spring 29 which permits the mouthpiece 5 in its entirety to rotate in a lateral direction in the event of a lateral stress on the asparagus, being the head itself the one to absorb any such stress and thus prevent the asparagus from any harm resulting therefrom.

The rotatory tree 28 is internally provided with a bevel pinion 30 through which the mouthpiece receives the oscillating motions required for completing the peeling in successive stages and over different zones of the periphery of the asparagus.

At the upper zone of the machine and in correspondence with an imaginary diametrical plane, at right angles to the drum 4, are situated the peeling devices in the strict sense, which are illustrated in full detail in FIGS. 12 through 15.

The said devices, the number of which is exactly the same as the number of mouthpieces 5 corresponding to a row and which face said mouthpieces, are associated to a carriage 31 mounted such that it may slide transversally on a second carriage 32, specifically through transversal guides 33, whereas said second carriage 32 is likely to slide in a vertical direction on a chassis 1 and through guides 34, operated by a pneumatic cylinder 35, whereas the first carriage is operated by another pneumatic cylinder 36.

The support 32 permits the cutting mechanisms to descend towards the zone where the asparagus are located, linked to the upper row of mouthpieces 5, while the support 31 facilitates the motions of lateral approach to the asparagus.

Figure 15:
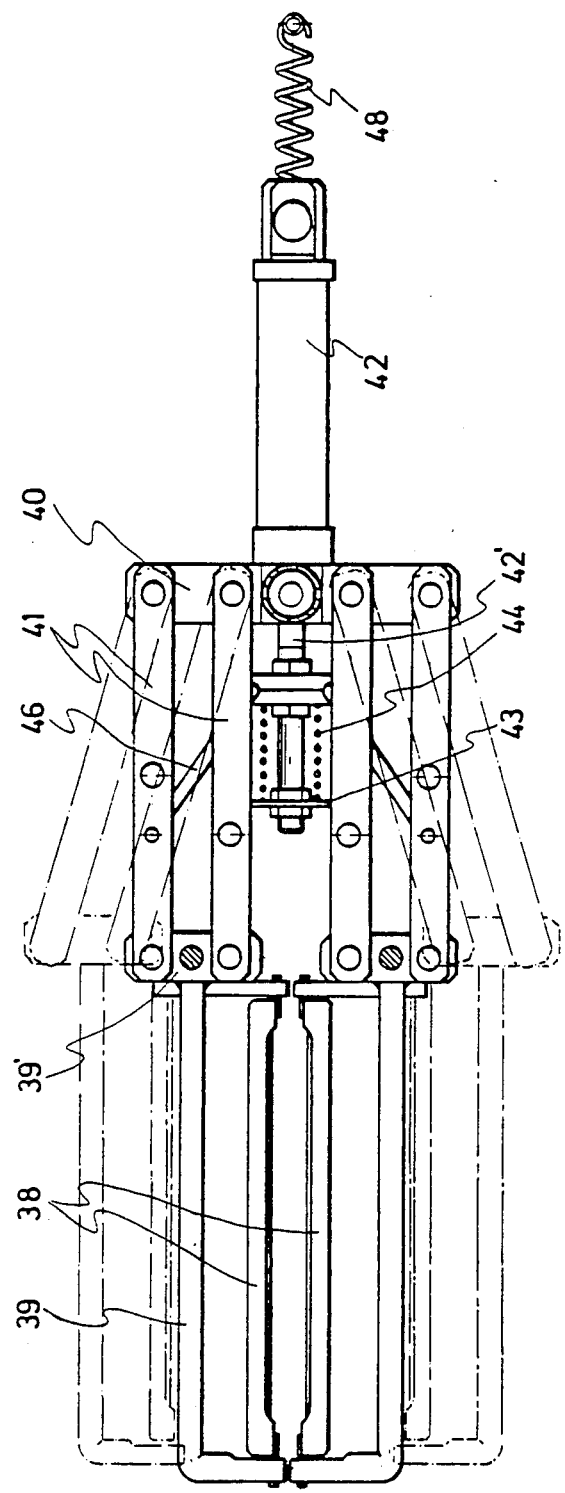
FIG. 15 is a plan view of the assembly illustrated in FIG. 12, wherein those mechanisms not strictly related to the cutting action itself have been eliminated.
Figure 19:
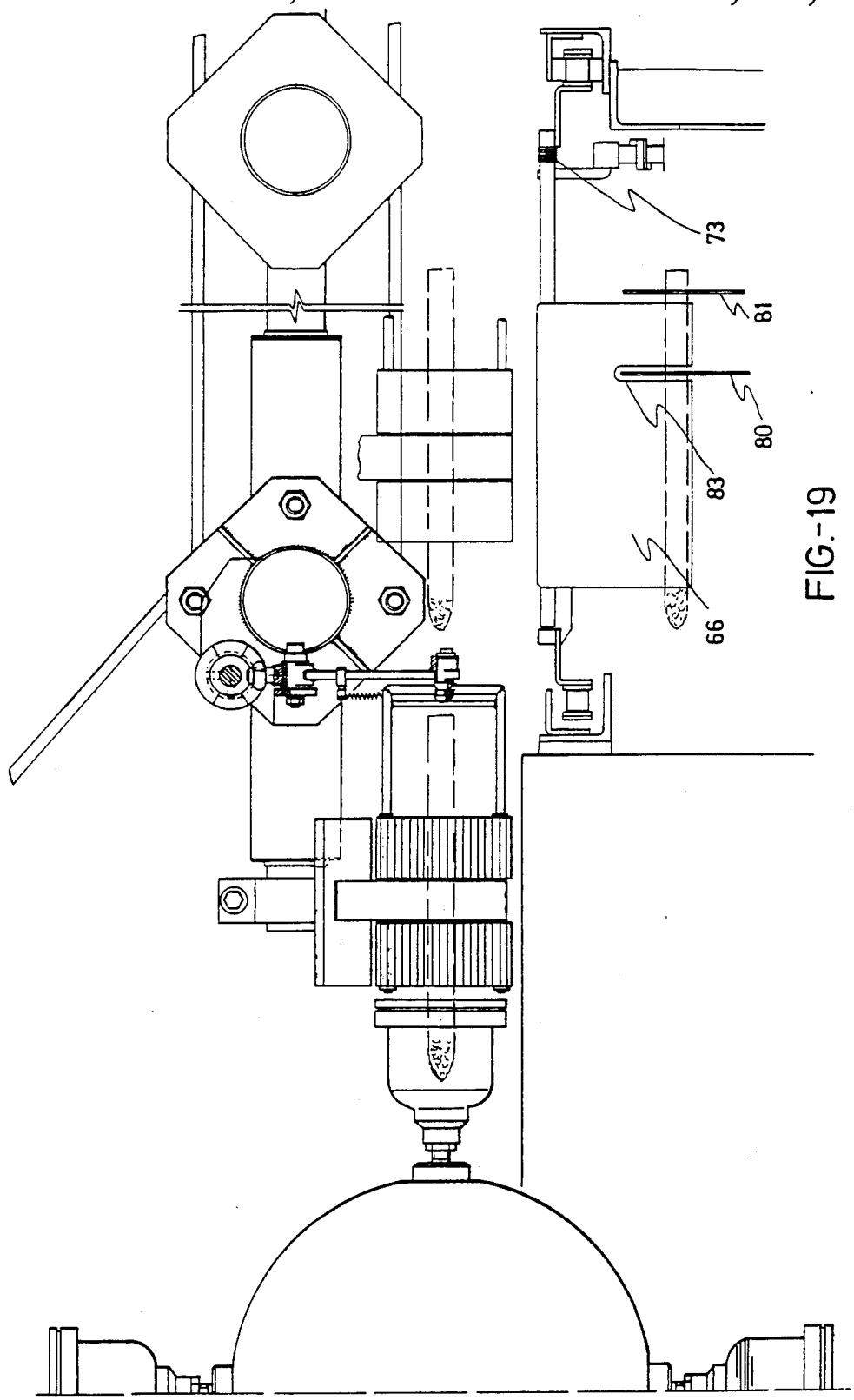
FIG. 19 is a profile of that zone of the machine where the extraction takes place, further illustrating the nipper of the previous figure and the bucket chain used to carry out the classification of the fruits.

Each said cutting mechanism, generally referred to under No. 37 in FIG. 1 and illustrated in full detail in FIGS. 12, 13 and 15, consists of a pair of knives 38 mounted on corresponding knife-supporting arms 39, each one of them is linked to a common support 40 with the cooperation of two hinged arms 41, in a manner such that the head 39' of each knife-supporting element forms, together with the support 40 and with its corresponding pair of arms 41, a deformable parallelogram, in order that the knife-supporting element 39 may constantly adopt a position at right angles to the support 40 and the two knives 38 may therefore be in a permanent parallel position with respect to each other.

In order to cause the toward and away movements of the knives, the cutting mechanism has, as it has been explained above, a microcylinder 42, common to both knives and mounted on said support 40 which is in turn related to the carriage 31, acting said rod 42' of said microcylinder, through a nut and a washer 43 established on its free end, on a spring 44 which in turn act on a piece 45 to which are hingedly joined two forks 46 likewise hingedly joined to the deformable parallelograms, in a manner such that, as it has likewise been explained above, the adequate regulation of the flow supplied to the microcylinder 42 determines a sufficiently slow velocity of approach for the knives 38 and, next to the contact thereof with the asparagus, they come to a halt, serving the rest of the path of said rod 42' to load the spring 44 which will subsequently supply the tension required for the knives to carry out the peeling cutting.

To the object of causing the lateral rotation of the knives, in the event of irregularities in the linearity of the asparagus, the support 40 is mountable on the general support 31 with the cooperation of a bearing 47 which permits the free rotation of said support 40 and consequently of the knives 38, against the slight tension of a spring 48 established, as can be seen in FIG. 12, between the free end of the very cylinder 42 and a bar 49 linked to the general support 31 and extending beyond the free end of said cylinder 42, parallel to the shaft thereof.

The very motion of approach of the knives is usable for the calibration of sizing of the asparagus, wherefore an incremental encoder 50 cooperates with each cutting mechanism. In more concrete terms, a small rack 51 is hingedly fixed to the supporting arm 39 of one of the peeling knives, while on the supporting arm of the other knife is mounted a guide 52 ensuring the gearing of the rack 51 on a toothed wheel 53 linked to the shaft 54 of the incremental encoder 50 supported by that same arm, such that, as it has been said before, the transversal displacement of the arm will be transformed into an electrical coding which, through the outlet 55, reaches the microprocesser to the object of being stored with a view to the subsequent selection of the asparagus.

At the rear zone of the machine are established a plurality of extraction nippers for the previously peeled asparagus, numerically and positionally coinciding with the retaining mouthpieces 5 and duly confronted with the row which, at a stop situation of the machine, is backwardly horizontally orientated, each of such nippers, generally referred to under number 56 in FIG. 2, being constituted by two arms 57 supporting respective pads 58 fixable by means of nippers 59, said arms 57 serving to hingedly mount all the nippers on a common support 60, particularly through the articulations 61.

Said arms 57 of each said nipper tend to adopt a closing position by the action of a spring 62 which relates them, whereas the opening position is carried out with the cooperation of a pair of cams 63 established on an auxiliary shaft 64 and upon which rests the end of arms 57, through rollers 65, as clearly illustrated in FIG. 18.

In a more concrete manner, the carriage or support 60 is operable by a pneumatic cylinder, while the hinged arms 58 are opened by the action of another small cylinder acting upon a rack which in turn acts upon a pinion linked thereto by means of the shaft 64, upon which are fixedly pierced the abovementioned cams 63.

When said nippers 56 close themselves upon the asparagus, the opening of the mouthpieces 5 is simultaneously produced, wherefore said asparagus are released with respect to the drum and the carriage 60 slides backwardly so to place the asparagus on a bucket chain 66, each of said buckets being constituted by two generally flat and independent pieces. One of such pieces, the one having reference number 67, adopts an inclined position, as clearly illustrated in FIG. 24, and it is fixed to the very chain 68 with the cooperation of a support 69, whereas the second piece 70 of the bucket is mounted, free to rotate, through the shaft 71, on a second support 72 linked to the very chain 68, and it is lowerable by the action of a spring 73 which releases a trigger 74, furnished with a roller 75, when said roller is left without the support provided by a guide 76 arranged all along the upper run or path of the buckets.

Figure 24:
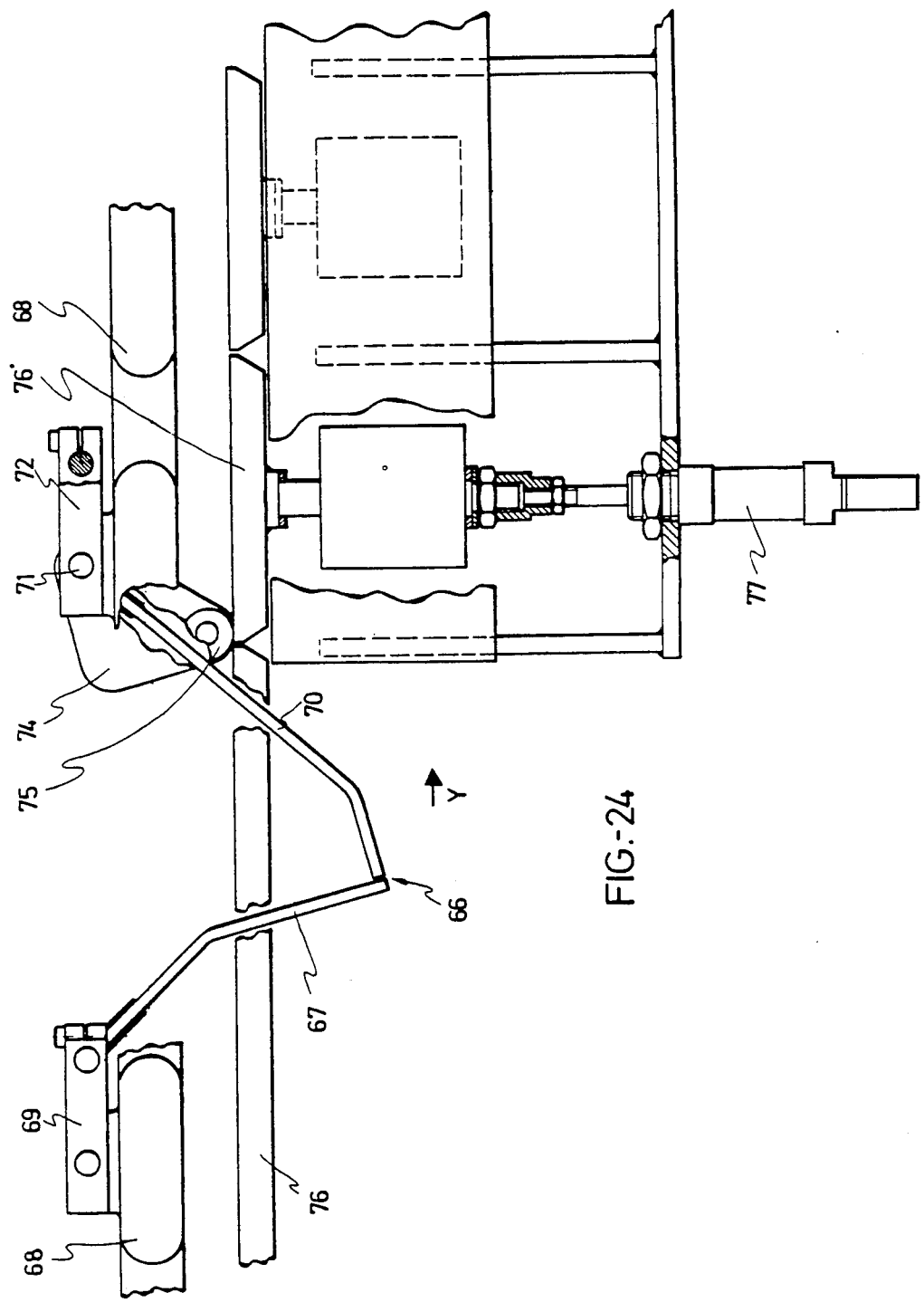
FIG. 24 is a profile of one of said buckets, wherein the discontinuous cam designed for unloading the buckets and the actuating minicylinder of one the sectors of the cam are also illustrated.
Figure 25:
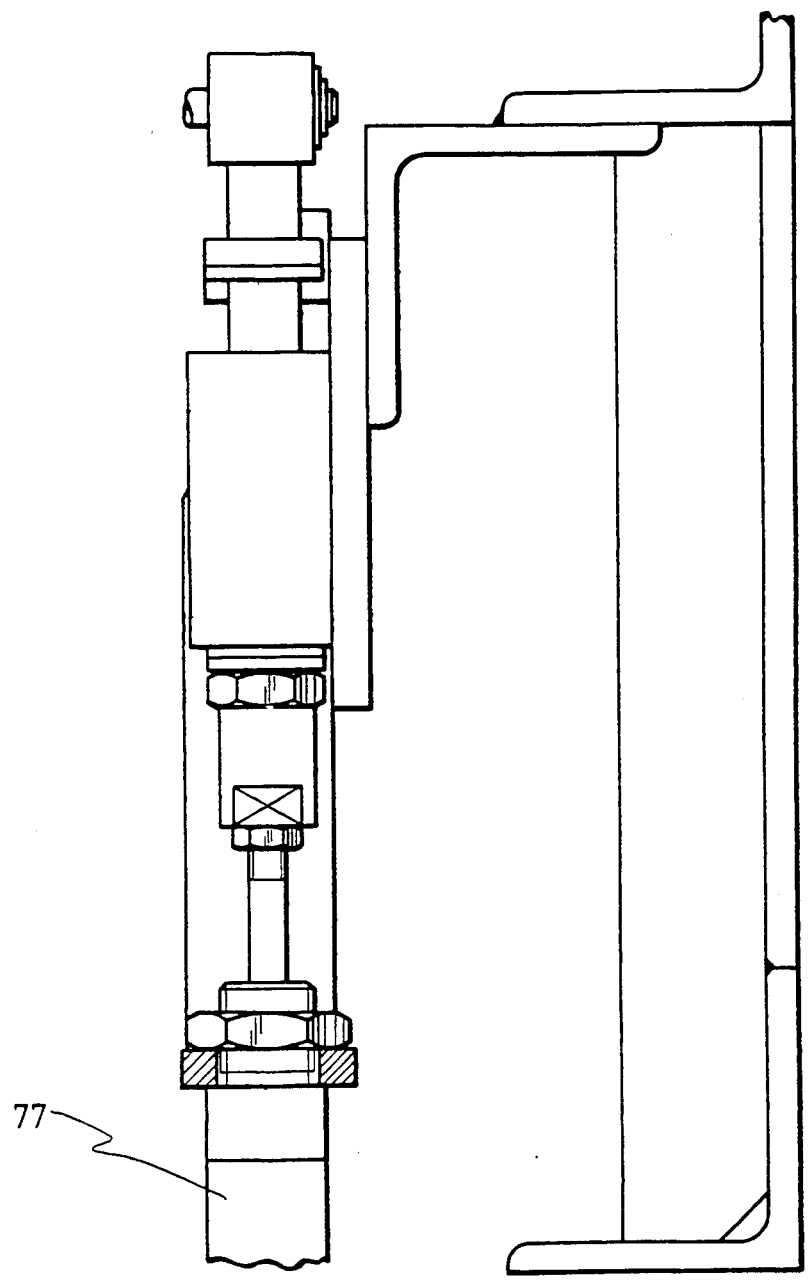
FIG. 25 finally illustrates a profile of the assembly illustrated in FIG. 24, at the level of the aforesaid minicylinder.

As it can also be seen in FIG. 24, the guide 76, at its zone corresponding to the expulsion or removal of the asparagus, is divided into regular section, thus giving rise to a series of lengths which can be known as cam lengths and which are referred to under reference number 76′.

The opening of the lowerable pieces 70 of the buckets is effected when the cam lengths 76′ corresponding to the expulsion zone, the number of which obviously coincide with that of the collectors foreseen as a function of the different types of asparagus existing, descend activated by corresponding pneumatic microcylinders 77, which are controlled by respective electrovalves operated from the microprocesser in the control unit of the machine.

Figure 20:
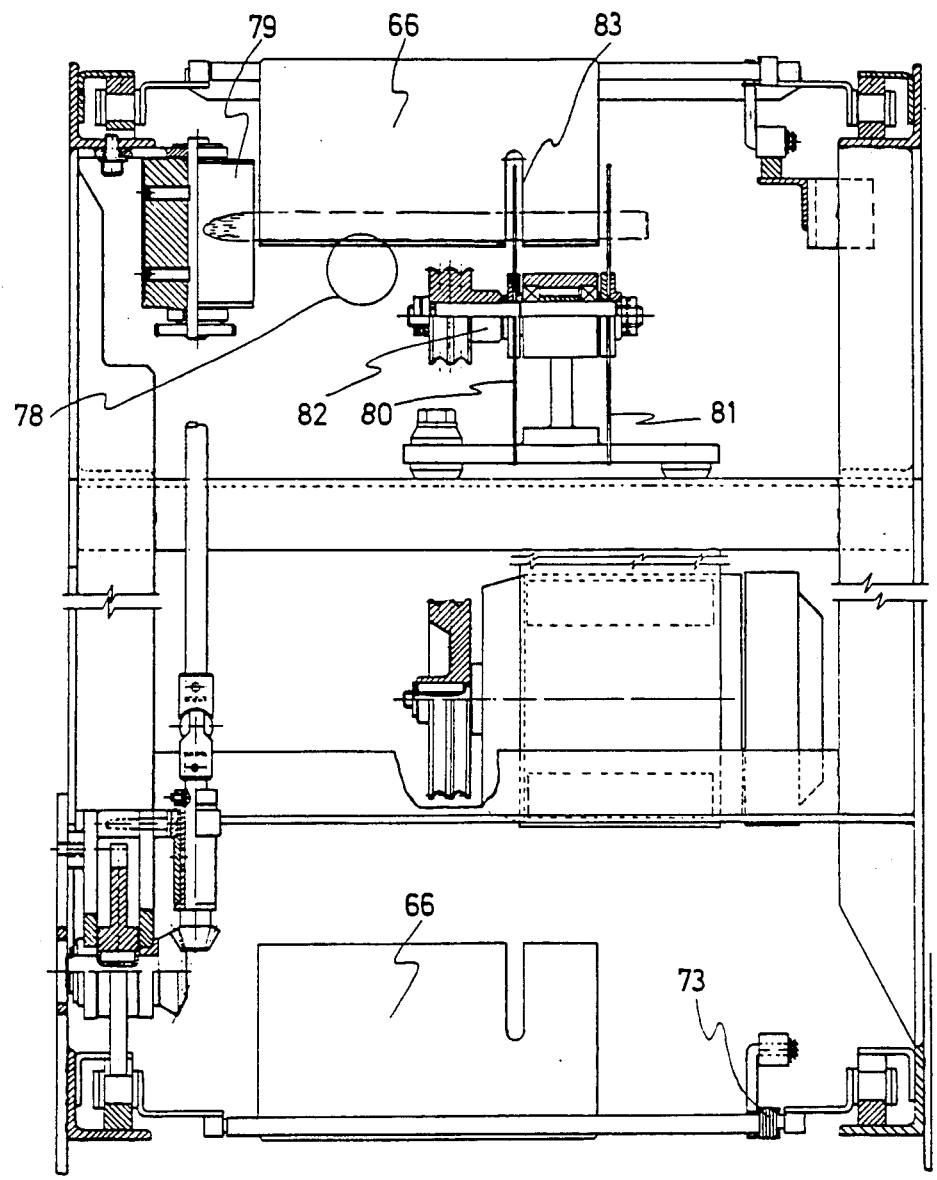
FIG. 20 is a close cross-sectional view of the bucket chain and its various accessories.
Figure 21:
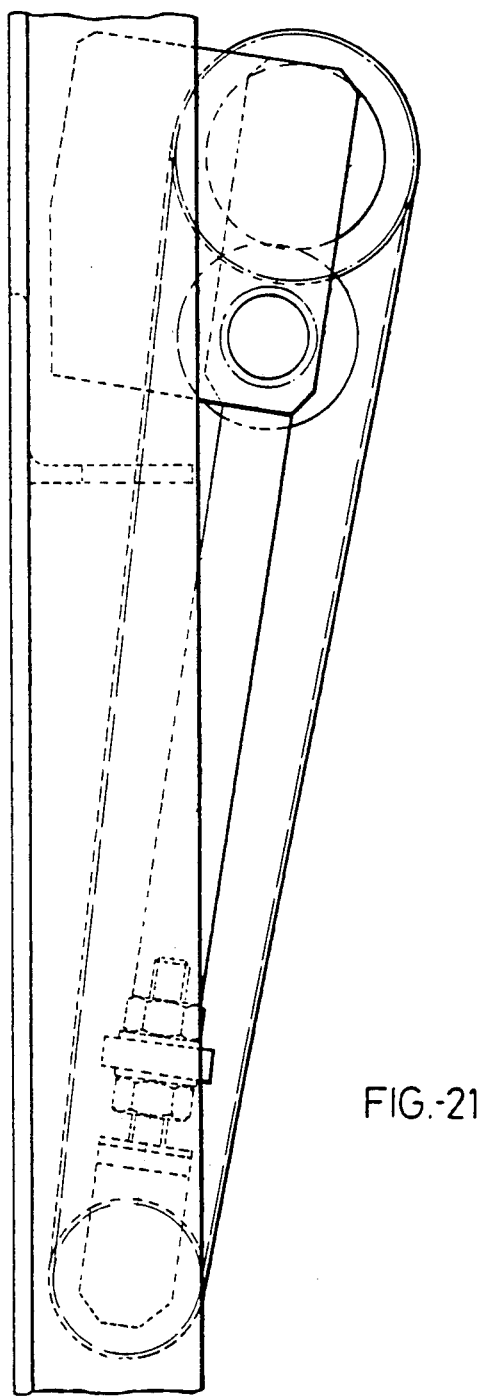
FIG. 21 is a close view of the assembly illustrated in FIG. 20.
Figure 22:
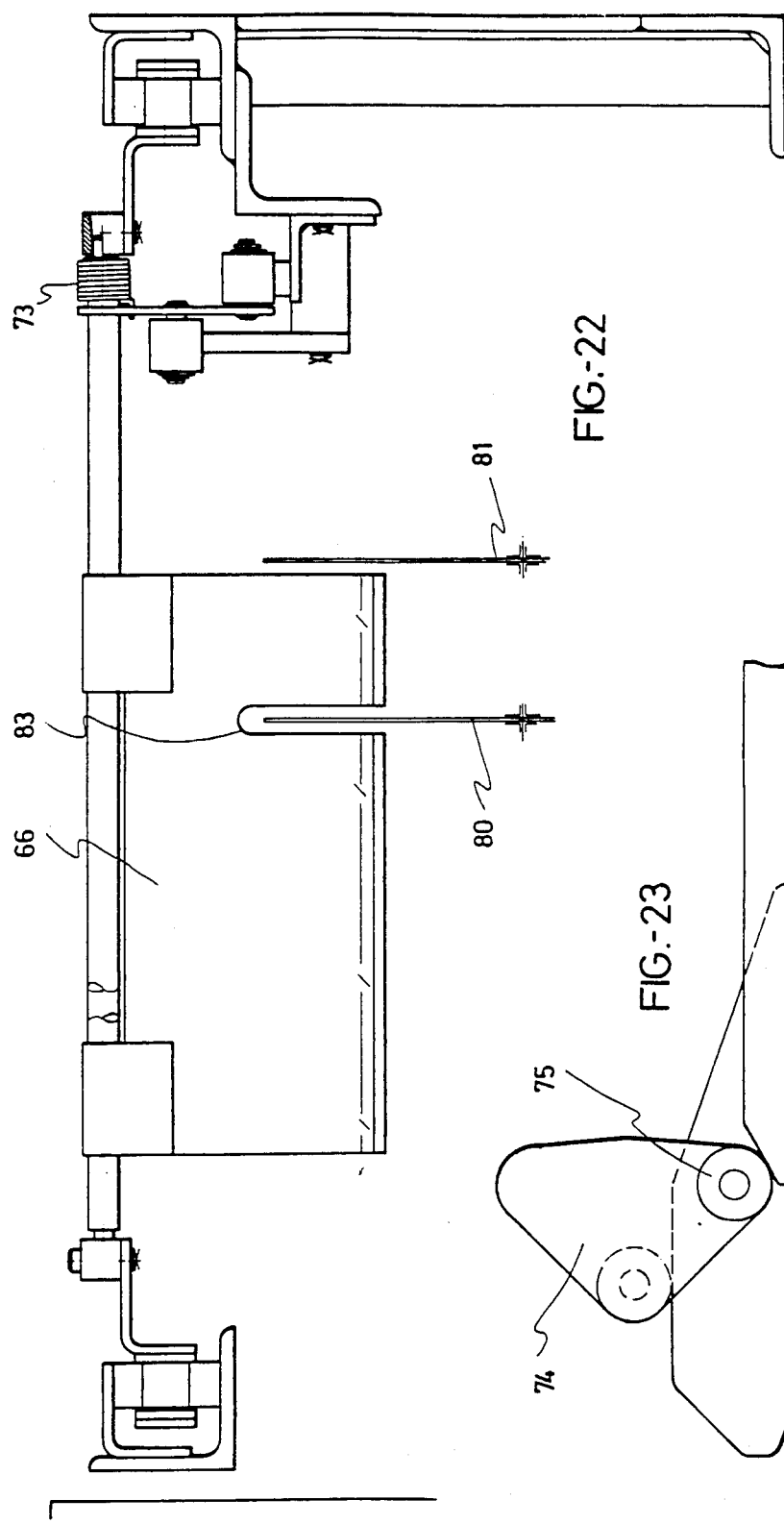
FIG. 22 is a side elevational view of one of the buckets with its corresponding actuating elements and a pair of cutting disks for the asparagus.
Figure 23:
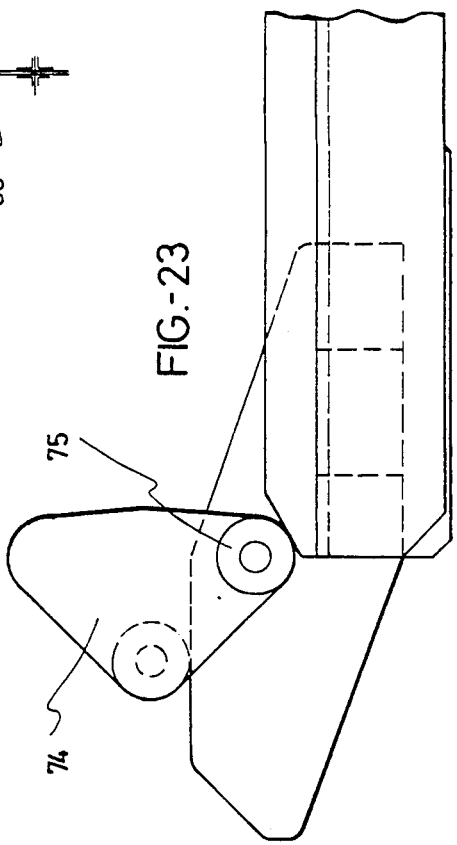
FIG. 23 is an enlarged close view of the cam designed for closing the buckets.

Last of all, the machine is also furnished with cutting means, given that, as it has been stated above, the asparagus must be cut at a previously established length, prior to their packing. In this sense, the machine has, underneath the bucket chain 66, a knurled rotatory cylinder 78 which, through friction, causes the asparagus to be displaced, according to their longitudinal shaft, towards a conveyor belt 79 which is displaced at the same speed as the bucket chain 66, wherefore said buckets are perfectly well positioned, immediately after which starts the cutting action of two rotatory disks 80 and 81, mounted on a common tree 82, one of said disks acceding to the interior of the bucket through a notch 83 operatively pierced thereon, while the second disk "attacks" the asparagus outside the bucket, as illustrated in full detail in FIG. 20. Thereby, it will be obtained, particularly through the first cutting disk 80, that the asparagus be cut at a previously selected length, like, for instance, the usual length of 155 mm., and that, from the remaining sector of the asparagus, portions or shoots of identical length may also be obtained, which shoots will be packed as a sub-product, whereas simply a small portion of the asparagus, situated opposite to the tip, is found to be useless.

The classsification criterion for the asparagus may be selected, and to that effect the microprocesser must be programmed adequately, either as a function of the maximum diameter found by said microprocessor after all the passes of the cutting knives have taken place, or as a function of the average maximum diameter found after the first five cutting passes, or even as a function of the average diameter found after all the cutting passes have occurred, which would indirectly be a good measure of the volume of the peeled fruit and would, therefore, give rise to a rather accurate estimate of its weight. The fruit may thus be classified according to the diameter of its transversal sections or according to its volume-weight characteristics, which suits well the needs of the canning industry.

It is not considered necessary to enlarge upon this description to enable a skilled person in the art to fully understand the scope and the advantages which may be derived therefrom.

The materials, shape, size and disposition of the elements are likely to be changed, provided that such changes do not alter the essentiality of the invention.

The terms used to describe the invention should always be taken in a broad and non-limiting sense.

Once the object of the present invention has been described, the essentiality thereof has been made more specific in the following

I claim:

1. Apparatus for sizing and peeling elongated, generally cylindrical bodies of vegetable matter such as spears of asparagus, comprising:

a drum mounted for stepwise rotation about a horizontal axis through a loading station, a peeling station and an unloading station which are disposed peripherally of the drum with substantially 90 degrees spacing between each said station respectively at a substantially horizontal position, a substantially vertical position and a substantially horizontal position;

a plurality of longitudinally extending rows of radially outwardly opening mouthpieces provided on said drum, each row extending substantially in alignment with said horizontal axis and arranged to be brought serially into each of said stations as said drum is rotated in a stepwise manner, each of said mouthpieces being adapted to telescopicaly receive an end portion of a respective cylindrical body of vegetable matter when that mouthpiece is in said loading station and to grip and maintain a grip on said end portion as said drum is rotated in a stepwise manner, until after the respective cylindrical body of vegetable matter has been peeled in said peeling station and has arrived at said unloading station;

said loading station being juxtaposed with said drum and including conveyor means arranged for individually serving each said mouthpiece in a respective row of said mouthpieces by accepting a respective generally cylindrical body of vegetable matter deposited thereon and guiding that body radially inwardly towards said drum until a respective said end portion of that body is telescopically inserted thereby into the respective said mouthpiece;

said peeling station being juxtaposed with said drum and including cutting means arranged for individually serving each said mouthpiece in a respective row of said mouthpieces by engaging and mechanically cutting an outer peripheral layer from a main portion of the respective generally cylindrical body of vegetable matter gripped in each respective mouthpiece in the respective said row, excepting said end portion of such body; and said unloading station being juxtaposed with said drum and including means for individually extracting each peeled, generally cylindrical body of vegetable matter from a respective said mouthpiece in a respective said row of said mouthpieces, as that mouthpiece releases its grip on the respective said end portion of the respective said body; and a take-away conveyor means on which each said extracting means deposits each respective said peeled, generally cylindrical body of vegetable matter extracted from a respective said mouthpiece thereby.

2. The apparatus of claim 1, wherein:

each said mouthpiece comprises an annular bushing having an inflatable liner, which, when inflated restricts in girth so as to grip a respective end podrtion of a respective said generally cylindrical body of vegetable material;

said apparatus further including means for inflating each said liner in a respective row of said mouthpieces in said loading station after each said mouthpiece in that row has received a respective end portion of a respective said body, and for maintaining that liner in an inflated condition until that liner has been rotated along with said drum so as to be disposed in juxtaposition with said unloading station.

3. The apparatus of claim 1, wherein:

said conveyor means of said loading station includes endless conveyor belt means having a generally horizontal carrying run directed generally towards said drum at such a level in relation to the respective said row of mouthpieces that said bodies deposited thereon are conveyed thereby endwise directly into respective ones of said mouthpieces.

4. The apparatus of claim 3, wherein:

said loading station further comprises, for each mouthpiece in a respective row, a pair of laterally spaced guide means juxtaposed with said carrying run of said endless conveyor belt means and converging from a relatively wide opening between them at a site which is relatively distant from said drum, towards said drum, so that as generally cylindrical bodies of vegetable material that, individually deposited on said endless conveyor belt means relatively distant from said drum, are conveyed by said endless conveyor belt means toward respective mouthpieces in a respective said row of mouthpieces, such bodies become increasingly more correctly oriented to have respective end portions thereof become telescopically received and gripped in respective ones of said mouthpieces.

5. The apparatus of claim 1, wherein:

said cutting means comprises a pair of diametrically-opposed knives for each said mouthpiece in said respective row being served by said cutting means; means for supporting each pair of knives for movement towards and away from one another within each said pair for accomplishing substantially equivalent-depth peeling of said generally cylindrical bodis of vegetable matter, even when said bodies are of respectively different initial diameters; means for repeatingly moving each pair of knives longitudinally relative to a respective said mouthpiece for removing in each pass two longitudinally extending strips of peel from each respective said body; and means for rotating at least one of:

all of said mouthpieces in said row being served by said cutting means, and all of said pairs of knives, at least generally about respective longitudinal axes of said mouthpieces in said row being served by said cutting means, in an indexing manner between passes of said pairs of knives so as to progressively remove one complete layer of peel from each of said bodies.

6. The apparatus of claim 5, wherein:

said mouthpieces are resiliently mounted to said drum by resilient means adapted to permit some temporary lateral inclination of individual ones of said mouthpieces relative to said drum in the respective said row being served by said cutting means, in order to absorb lateral stress applied to respective of said bodies by respective of said pairs of knives.

7. The apparatus of claim 5, further including:

microprocessor means operatively associated with respective of said pairs of knives for acquiring a set of signals while the knives in each said pair of knives are moving laterally relative to a respective said body in connection with engaging and peeling that body, each of which sets of signals is indicative of the relative diameter of a respective said body, and for storing that set of signals for use in subsequently shunting each said body, following peeling thereof, into a respective one of a plurality of collection paths depending upon sensed relative body diameter;

said take-away conveyor means includes shunting means subject to control by said microprocessor for shunting individuals of said peeled, generally cylindrical bodies of vegetable matter into a respective said collection path depending upon sensed relative body diameter.

8. The apparatus of claim 2, wherein:

said unloading station further includes means for arranging all of the peeled, generally cylindrical bodies of vegetable matter extracted from said respective row of said mouthpieces juxtaposed with said unloading station, so that respective one ends of all of these bodies meet an imaginary longitudinally extending line; and first cutting means juxtaposed with said take-away conveyor means for severing each said body cross-wise thereof at a first uniform distance from said one end thereof subsequent to arrangement of such bodies by said arranging means.

9. The apparatus of claim 8, wherein:

said unloading station further comprises second cutting means juxtaposed with said take-away conveyor means at a constant distance from said first cutting means for severing each body cross-wise thereof at a second uniform distance from said one end thereof which is longer relative to said one end thereof than said first uniform distance in order, cooperatively with said first cutting means to sever each said peeled body into a primary product of a first uniform length, a seconary product of a second uniform length, and a remainder of variable length.

* * * * *